(12) United States Patent
Traversat et al.

(10) Patent No.: US 9,798,529 B2
(45) Date of Patent: Oct. 24, 2017

(54) JAVA STORE

(75) Inventors: Bernard A. Traversat, Menlo Park, CA (US); James A. Gosling, Redwood City, CA (US); Michael J. Duigou, Berkeley, CA (US); Henry Jen, San Jose, CA (US); Mohamed M. Abdelaziz, Santa Clara, CA (US); Brian Goetz, Williston, VT (US)

(73) Assignee: ORACLE AMERICA, INC., Redwood City, CA (US)

( * ) Notice: Subject to any disclaimer, the term of this patent is extended or adjusted under 35 U.S.C. 154(b) by 585 days.

(21) Appl. No.: 13/320,853

(22) PCT Filed: May 24, 2010

(86) PCT No.: PCT/US2010/035947
§ 371 (c)(1),
(2), (4) Date: Nov. 16, 2011

(87) PCT Pub. No.: WO2010/138449
PCT Pub. Date: Dec. 2, 2010

(65) Prior Publication Data
US 2012/0072905 A1    Mar. 22, 2012

Related U.S. Application Data

(60) Provisional application No. 61/182,303, filed on May 29, 2009.

(51) Int. Cl.
*G06F 9/44* (2006.01)
*G06F 9/445* (2006.01)
*G06F 21/12* (2013.01)

(52) U.S. Cl.
CPC .............. *G06F 8/60* (2013.01); *G06F 21/121* (2013.01)

(58) Field of Classification Search
None
See application file for complete search history.

(56) References Cited

U.S. PATENT DOCUMENTS 8,327,451 B2* 12/2012 Duri ..................... G06Q 20/382
                                                          726/1
2003/0084165 A1* 5/2003 Kjellberg et al. ............. 709/227
(Continued)

FOREIGN PATENT DOCUMENTS

| CN | 1675881 A | 9/2005 |
| CN | 101304438 A | 11/2008 |
| KR | 10-2010-0120010 A | 11/2010 |

OTHER PUBLICATIONS

Office Action in Chinese Patent Application No. 201080022852.0 dated Oct. 17, 2013, with English translation (19 pages).
(Continued)

*Primary Examiner* — Qamrun Nahar
(74) *Attorney, Agent, or Firm* — Fish IP Law LLC

(57) ABSTRACT

A computer readable medium including computer readable code for causing a computer system to perform a method. The method includes receiving an application, receiving application information for the application, and determining an access privilege for the application based, in part, on the application information. The method also includes generating a deployment package for the application using the application and the access privilege, and publishing the application.

17 Claims, 21 Drawing Sheets

(56) References Cited

U.S. PATENT DOCUMENTS

| | | | |
|---|---|---|---|
| 2004/0127196 A1 | 7/2004 | Dabbish et al. | |
| 2004/0193550 A1* | 9/2004 | Siegel | 705/67 |
| 2004/0210535 A1* | 10/2004 | Erickson | 705/54 |
| 2005/0246282 A1 | 11/2005 | Naslund et al. | |
| 2007/0271191 A1 | 11/2007 | Torrubia-Saez | |
| 2009/0007062 A1* | 1/2009 | Gilboa | G06Q 10/10 717/105 |
| 2010/0157989 A1 | 6/2010 | Krzyzanowski et al. | |
| 2012/0240240 A1 | 9/2012 | Naslund et al. | |

OTHER PUBLICATIONS

International Search Report from PCT/US2010/035947 dated Dec. 10, 2010 (2 pages).
Office Action in corresponding Chinese Patent Application No. 201080022852.0 dated May 9, 2014, with English translation (20 pages).
Office Action issued in counterpart Chinese Patent Application No. 201080022852.0 dated Jan. 6, 2015 (22 pages).
Office Action issued in counterpart Chinese Patent Application No. 201080022852.0 dated Jul. 17, 2015 (18 pages).
"Reborn:Maxthon 2.0 Preview Depth Exprience", http://arch.pconline.com/pcedu/pingce/0605/792294.html, published on May 9, 2006, with English Translation, 28 pages.

* cited by examiner

Submit New Application
☑ Show Field Help *Indicates a Required Field

| Product | Details | Libraries | Legal | Images | Icons | Notes |

* Application Name: _____ 805

* Short Description: _____ 810
0-185 Characters

* Full Description: ◁ ▷ 815
0-800 Characters

* Categories:
Do it Yourself
Games
Finance
Home
◁ ▷ 820

* Help Page URL: _____ [Test URL] 825
830 —
835 — Application Price: ⦿ Free ○ Price: $ [0.00] USD
Auto-Publish: ☐ Automatically publish upon approval

[Save Draft]   [Next▷]  [Cancel]

FIG. 8

Submit New Application

☑ Show Field Help  * Indicates a Required Field

Submitted 〉 Approved 〉 Published

Press 'Submit for Approval' below to proceed.

Step 1 of 4: Main - Images - Details - Review Notes

* Application Name: _____ —905

* Short Description: [        ] —910

* Full Description: [◀ ▭ ▶] —915

* Category: [Games ▾] —920

*—930 Upload JAR from: [_____] [Browse...] [Run Now]
*—935 Upload Preview from: [_____] [Browse...] [Run Now]  —955
* Help Page URL: [_____] [Test URL]

925—

[Open Store View] [Save Draft]    [Next>]  [Submit for Approval] [Cancel]
       940        945      950    955         960

FIG. 9

Submit New Application

☑ Show Field Help * Indicates a Required Field

Step 4 of 4: Main - Images - Details - Review Notes

Submitted ⟩ Approved ⟩ Published

Press 'Submit for Approval' below to proceed.

The contents of this tab are optional - all the fields can be left at default/blank values.

Application ID: _____ 1110
Version Number: _____ 1115
Version Description:
[                    ] 1120

JRE Version Required: [7.1 ▼] 1125
Java Sandbox: ☐ All Permissions 1130

[Open Store View] 940  [Save Draft] 945
[<Previous] [Next>] 1005
[Submit for Approval] 955  [Cancel] 960

JAVA STORE

CROSS-REFERENCE TO RELATED APPLICATIONS

This application claims priority under 35 U.S.C. §119(e) to U.S. Provisional Patent Application No. 61/182,303 entitled "Java Store," filed on May 29, 2009 in the names of Bernard A. Traversat, Jonathan I. Schwartz, James A. Gosling, Joshua M. Marinacci, Michael J. Duigou, Henry Jen, Mohamed M. Abdelaziz, Brian Goetz, Anant K. Mithal, Dusan Palvica, Jean Yao, Gemma Watson, Eric N. Klein, Jr., Octavian Tanase, John E. Muhlner, Aurelio Garcia-Ribeyro, and Thomas V. Ng, which is hereby incorporated by reference in its entirety.

BACKGROUND

Software developers are constantly creating new applications around the country, and even around the world. Software development may be accomplished using a variety of platforms, including, but by no means limited to, Java™ and JavaFX™ (Java® and JavaFX® are registered trademarks owned by Sun Microsystems, Inc., Mountain View, Calif.). When a new application is developed, the developer must find a way to make the application available to those users interested in the application. This may be accomplished, for example, by soliciting users who may be interested in such an application. The developer may, for example, distribute copies of the application via removable storage device, such as a CD-ROM.

SUMMARY

In general, in one aspect, the invention relates to a computer readable medium comprising computer readable code for causing a computer system to perform a method. The method includes receiving an application, receiving application information for the application, and determining an access privilege for the application based, in part, on the application information. The method also includes generating a deployment package for the application using the application and the access privilege, and publishing the application.

In general, in one aspect, the invention relates to a system for publishing an application. The system includes a processor and a memory comprising computer readable code, executable by the processor, configured to receive an application and application information for the application. The computer readable code is further configured to determine an access privilege for the application based, in part, on the application information, and generate a deployment package for the application using the application and the access privilege. The computer readable code is further configured to publish the application to make the deployment package available for at least one selected from a group consisting of installation on a client device and previewing on a client device.

Other aspects of the invention will be apparent from the following description and the appended claims.

BRIEF DESCRIPTION OF DRAWINGS

FIGS. 7-20 show examples according to one or more embodiments of the invention.

DETAILED DESCRIPTION

Figure 1:
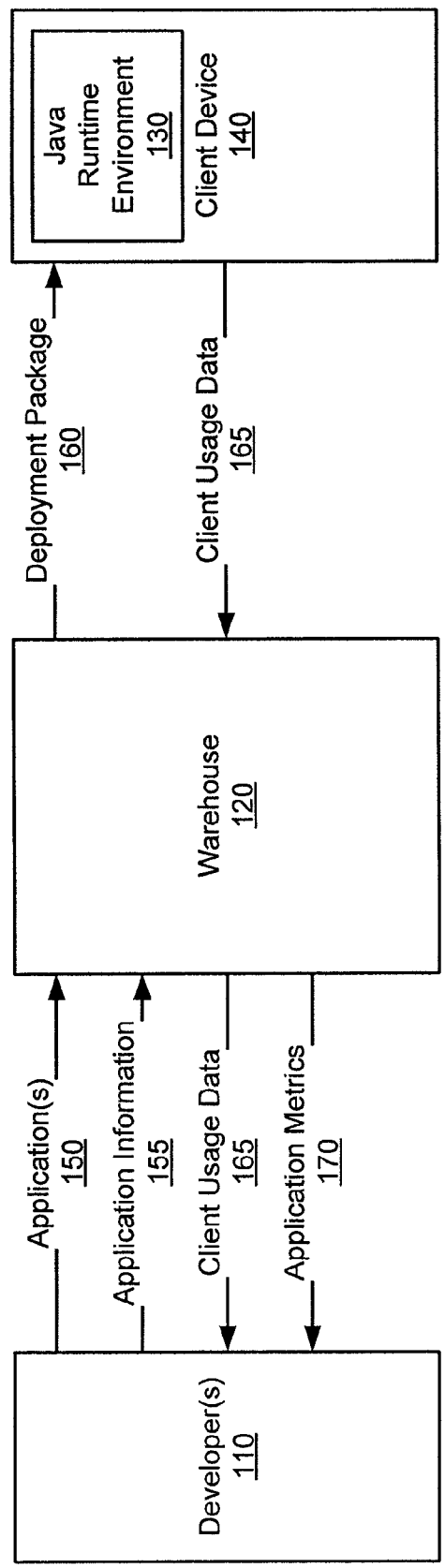
FIG. 1 shows a system in accordance with one embodiment of the invention.

Specific embodiments of the invention will now be described in detail with reference to the accompanying figures. Like elements in the various figures (also referred to as FIGS.) are denoted by like reference numerals for consistency.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to publishing and distributing applications. More specifically, embodiments of the invention relate to publishing and reviewing of the applications (e.g., Java or JavaFX applications) capable of executing in the Java Runtime Environment (JRE) regardless of the computing platform upon which the JRE is executing and distributing the applications. According to one or more embodiments of the invention, this involves determining that the application is a proper application, and determining access privileges for the application.

In one embodiment of the invention, the applications, once complied, are in a byte-code format. The compiled applications are configured to execute on a Java Virtual Machine (JVM). More specifically, the JVM includes functionality to launch the execution of the JRE and allow the application to execute within the JRE. The execution of the applications include reading and verifying byte-code, determining the corresponding native-platform machine code, and issuing the corresponding native-platform machine code to the client device OS and/or hardware. In one embodiment of the invention, the JVM may implement one or more "sandboxes", where each sandbox is an isolated execution environment within the JRE. Applications executing within a sandbox may only interact with the JVM and other applications within the sandbox; however, the applications may interact with applications executing outside the sandbox. Further, the JVM may place further restrictions on how applications may execute within a given sandbox.

FIG. 1 shows a system in accordance with one embodiment of the invention. The system includes one or more application developers (110), a warehouse (120), and one or more client devices (140). Each of these components is discussed below.

In one embodiment of the invention, the developers (110) generate, create, or otherwise obtain applications (150). According to one or more embodiments of the invention, the applications may be, but are not limited to, Java (any edition, version) and JavaFX applications. The developers then provide these applications (150) to the warehouse (120) for distribution. In addition, according to one or more embodiments of the invention, the developers (110) provide the warehouse (120) with application information (155) (i.e., data related to the application). More detail about application information will be provided in FIGS. 8-11.

According to one or more embodiments of the invention, the developers (110) also receive data from the warehouse (120) regarding applications that have been submitted (i.e., Application (150)). According to one or more embodiments of the invention, this data may include client usage data (170), and application metrics (175). According to one or more embodiments of the invention, client usage data (170) may correspond to data (e.g., without any personal identification information) detailing how a given application was/ is used on one or more client devices (140). According to one or more embodiments of the invention, the client usage data (170) may include such information as how often users started and/or stopped an application (150), what pages are accessed by a user, the order in which the user navigated through the various pages in the application, how the pages were accessed, how the user interacted with the user interface (e.g., which buttons where clicked by the user, etc.) and time spent on accessing pages. In addition, the developers (110) may receive application metrics (175).

According to one or more embodiments of the invention, application metrics (175) may include the number of times an application has been installed or reinstalled, the number of times the application has been viewed, the number of times the application has been removed by a user, and the number of times the application has resulted in a catastrophic error (i.e., the application "crashed"). According to one or more embodiments of the invention, application metrics (175) are generated by the warehouse (120), as described below.

In one embodiment of the invention, the warehouse corresponds to one or more computer systems (e.g., servers) configured to interface with the developers and the client devices. Generally, according to one or more embodiments of the invention, the warehouse (120) receives applications from the developer (110) and provides them to users by providing them to a client device (140). According to one or more embodiments of the invention, the application (150) is provided to the warehouse (120) packaged in a standard Java Archive (JAR) file. The warehouse is configured to store one or more applications. Further, the warehouse may store different versions (e.g., version 1, version 1.1, version 2, etc.) of the same application, where each version includes different features and/or content. For example, according to one or more embodiments of the invention, different versions of the application may be stored for various screen sizes and input capabilities (e.g., touch-screen, physical keyboard input, track ball input, etc.). In addition, the warehouse may store multiple instances of a given version of an application, where each instance of the application is configured to be deployed on a different type of client device (e.g., one instance for a desktop deployment, one instance for deployment on a mobile device, etc.). Further, in one embodiment of the invention, the warehouse includes functionality to support the embodiments described in one or more of FIGS. 3-6. An embodiment of the warehouse is described in FIG. 2.

According to one or more embodiments of the invention, the warehouse (120) is configured to use the client usage data to generate trends on how an application (150) is used—and subsequently send the generated trends to the developer. Alternatively, or in addition to the above, the warehouse (120) may be configured to send the client usage data to the developer. In one embodiment of the invention, the client usage data is an aggregation of the client usage data obtained from a number of individual client devices executing the application. In one embodiment of the invention, application metrics include other information tracked by the warehouse other than client usage data. For example, the application metrics may indicate the number of times a given application was previewed (described below in FIG. 5), the number of times a given application was installed on a client device, the types of client devices on which the application is currently stored, etc.

The warehouse is configured to communicate with the developers (110) and the client device (140) over a wired network, a wireless network, or any combination thereof. Further, the warehouse (120) and the client devices (140) may communicate over a wired network, a wireless network, or any combination thereof. According to one or more embodiments of the invention, upon receiving the application (150) and the application information (155), the warehouse (120) may package the application in a deployment package (160) that is made available to users. According to one or more embodiments of the invention, a developer (110) and a user on a client device (140) may interact with the warehouse (110) using an interface.

In one embodiment of the invention, the client devices (140) are configured to receive the application as a deployment package (160) from the warehouse (120). In one embodiment of the invention, the deployment package conforms to the Java Network Launch Protocol (JNLP) such that the application may be executed using the Web Start feature of JNLP. In one embodiment of the invention, the client devices also support JavaFX, which is used to obtain client usage data associated with the execution of applications in the JRE on the client device.

In one embodiment of the invention, a client device (140) is any device upon which a JRE may execute. Said another way, each client device (140) includes a Java Runtime Environment (130). According to one or more embodiments of the invention, users access applications from the warehouse (120) using the client device (140). Examples of client devices include, but are not limited to, a computer connected to a wired network, a computer connected to a wireless network, a 2G mobile device, a 3G mobile device, a personal digital assistant, a smart phone (i.e., a mobile phone offering advanced capabilities, often with PC-like functionality, e.g., iPhone, Blackberry, mobile phone executing an Android mobile device platform), a set-top box (i.e., a device that connects to a television (or other display device) and an external signal source, turning the signal into content which is then displayed on the television screen (or screen of the display device)), etc.

Figure 2:
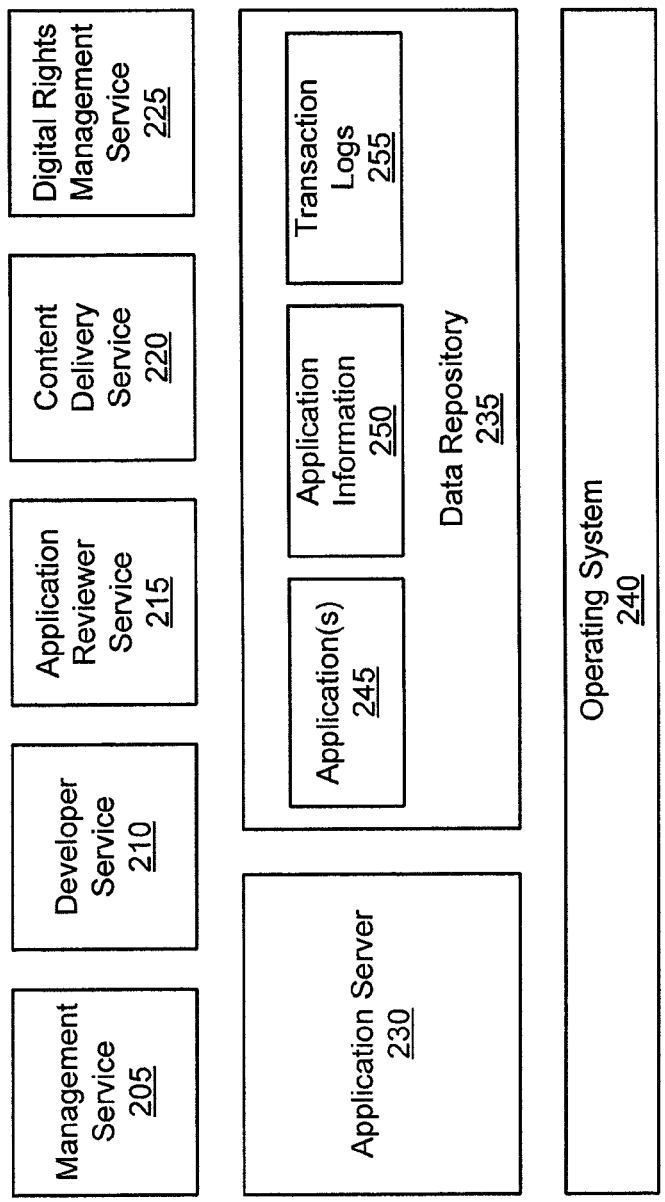
FIG. 2 shows the architecture of the warehouse in accordance with one embodiment of the invention.

FIG. 2 shows the architecture of the warehouse (i.e., warehouse (120) of FIG. 1) in accordance with one embodiment of the invention. The warehouse includes an operating system (OS) (240), e.g., Solaris™, Linux™, Unix™, Windows™, or any other operating system (Solaris® is registered trademarks owned by Sun Microsystems, Inc., Mountain View, Calif.; Linux® is a registered trademark owned by Linus Tourvalds, Santa Clara, Calif.; Unix® is a registered trademark of The Open Group; and Window® is a registered trademark owned by the Microsoft Corporation, Redmond, Wash.). The OS executes an application server (230) (e.g., Glassfish) which is configured to host the application programming interfaces (APIs) to the services provided by the warehouse.

In one embodiment of the invention, the warehouse includes a management service (205), a developer service (210), an application reviewer service (215), a content delivery service (220), and a digital rights management service (225). Each of these services is described below.

In one embodiment of the invention, the management service (205) provides warehouse administration services (accessed via a universal resource locator (URL)) including configuration of the warehouse hardware and software. For example, according to one or more embodiments of the invention, the management service is configured to track developers that are submitting content to the warehouse (i.e., warehouse 120 of FIG. 1). According to one or more embodiments of the invention, the management service (205) is configured to track the purchase transactions and/or deployment of applications. According to one or more embodiments of the invention, the management service (205) is configured to manage the display of applications in the catalogue to the consumer. Finally, according to one or more embodiments of the invention, the management service (205) manages the state of submitted content to the warehouse (e.g., submitted, approved, under review, published, or quarantined).

In one embodiment of the invention, the developer service (210) provides developers with a portal (accessed via a URL) to transmit/upload applications and corresponding application information to the warehouse. In addition, the developers may register with the developer service to receive application metrics and client usage data (described above) for applications submitted by the developer (or other third-party which submitted the application). Examples of such a portal are shown in FIGS. 8-11.

In one embodiment of the invention, the application reviewer service (215) provides application reviewers with a portal (accessed via a URL) to review and approve applications submitted by the developers (via the developer service) for publication to users. According to one or more embodiments of the invention, an application may be executed directly from the portal (i.e., without installing or purchasing the application). The application reviewer service (215) may also enable the reviewer to set access privileges for the application, according to one or more embodiments of the invention. According to one or more embodiments of the invention, the review service provides the ability to verify that the content of the application is appropriate (e.g., if the application is for elementary school children, then the content of the application is reviewed to ensure that it is age appropriate), that the content of the application matches the description, and that there is no virus or rogue behavior (e.g., the application performs an unauthorized access of the user's personal files) when the application is running. Further, according to one or more embodiments of the invention, the review service provides the ability to verify that the application has the proper set of permissions to access user folders or the network, and that the application is compatible with various operating systems upon which it will be deployed (e.g., Windows Mobile, Android, Linux, etc).

In one embodiment of the invention, the content delivery service (220) provides users with a portal (accessed via a URL) to (i) view applications (245) in the warehouse, (ii) package the applications for delivery to the client devices for install or preview using JNLP, (iii) manage application versions and instances, (iv) manage billing and invoicing (as necessary), (v) respond to requests to confirm that a given client device includes the latest version of a given application, (vi) to track which applications are installed by each user on their client devices (e.g., user A loaded application 1 on their mobile device), and (v) maintain user account information (e.g., username, password, etc.). Examples of the content delivery service portal are shown in FIGS. 15-20.

In one embodiment of the invention, the digital rights management service (225) includes functionality to set digital rights management (DRM) settings for a given application, a particular user, a particular client device type, or any combination thereof. For example, the DRM settings may specify, but are not limited to specifying: (i) where the application may execute (e.g., on what system the application may execute), (ii) whether a given instance of the application may be copied to multiple client devices, (iii) what features of the application the user may access, and (iv) the duration for which the application (or a given feature of the application) is available. Further, according to one or more embodiments of the invention, the DRM settings may provide the ability to track the type of license that the consumer has purchased. For example, the consumer may purchase a perpetual license, a subscription license, or a per content access license. According to one or more embodiments of the invention, the DRM service (225) prohibits users from copying an application and using it on a different system without purchasing a valid license. According to one or more embodiments of the invention, the DRM management service also verifies the level of access available to a user on a particular application (e.g., if the application is a game that includes 5 levels but the user only has a license to access levels 1-3, then the DRM may enforce this restriction).

In one embodiment of the invention, the executable code for the applications (245), the application information (250), and the transaction logs (255) are stored in a data repository (235) in the warehouse. In one embodiment of the invention, the data in the data repository is managed by a file system, such as ZFS, Network File System (NTFS), Universal Disk Format (UDF), or any other file system (or combination thereof). In addition, as an alternative, one or more of the executable code for the applications (245), the application information (250), and the transaction logs (255) may be stored in a content delivery network (i.e., a geographically distributed storage network) to facilitate efficient transmission of applications, etc. to the consumers. In such embodiments, the warehouse includes functionality to access the content delivery network and manage the data stored in the content delivery network.

In one embodiment of the invention, the application information (250) is stored in the data repository as an Extensible Mark-up Language (XML) file. Those skilled in the art will appreciate that the application information may be stored in a format other than (or in combination with) XML. According to one or more embodiments of the invention, the developers (110) also provide the warehouse (120) with application information (155) related to the submitted application (150). According to one or more embodiments of the invention, the application information (155) may include, but is not limited to, an application name, a subtitle, a description, a category, license requirements (e.g., perpetual, subscription, or free), and a price. According to one or more embodiments of the invention, the subtitle is a short description of the invention that accompanies the application name. According to one or more embodiments of the invention, the description may be a popup description or a full description. Further, according to one or more embodiments of the invention, the application information could include a popup description as well as a full description. According to one or more embodiments of the invention, the popup description will appear when a user hovers over an icon associated with the application in a display. Regarding the full description, according to one or more embodiments of the invention, the full description will be made available to users who request more information about an application. Regarding the category, according to one or more embodiments of the invention, a developer (110) will choose a descriptive term from a preexisting list that describes the application (i.e., "Social Networking," "Sports," "Finance," etc.). According to one or more embodiments of the invention, the application information may include other information, such as a help page uniform resource locator ("URL"), one or more icons associated with the application (150), and screenshots of the application (150).

Figure 3:
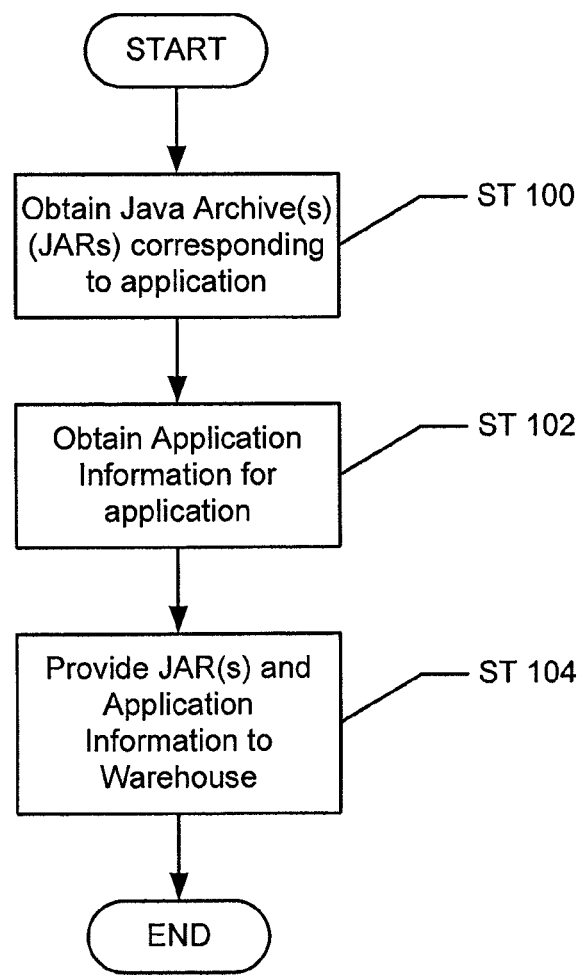
FIGS. 3-6 show methods in accordance with one or more embodiment of the invention.

FIG. 3 shows a method in accordance with one or more embodiment of the invention. More specifically, FIG. 3 shows a method for providing an application to the warehouse. While the various steps in the flowchart are presented and described sequentially, one of ordinary skill will appreciate that some or all of the steps may be executed in different orders, may be combined, or omitted, and some or all of the steps may be executed in parallel.

In Step 100, one or more Java Archives (JARs) for the application are obtained (generated, or created, etc) by a developer (or other third-party providing applications to the warehouse). In Step 102, the application information for the application is obtained. In one embodiment of the invention, the application information may be obtained (generated, or created) using any known mechanisms in the art including completing a web-based form, providing a text document, providing an XML document, etc. In Step 104, the JAR(s) and the corresponding application information are provided to the warehouse. According to one or more embodiments of the invention, the application and application information are provided to the warehouse by sending them across a network. In one embodiment of the invention, one or more steps in FIG. 3, may be performed using the developer service.

Figure 4:
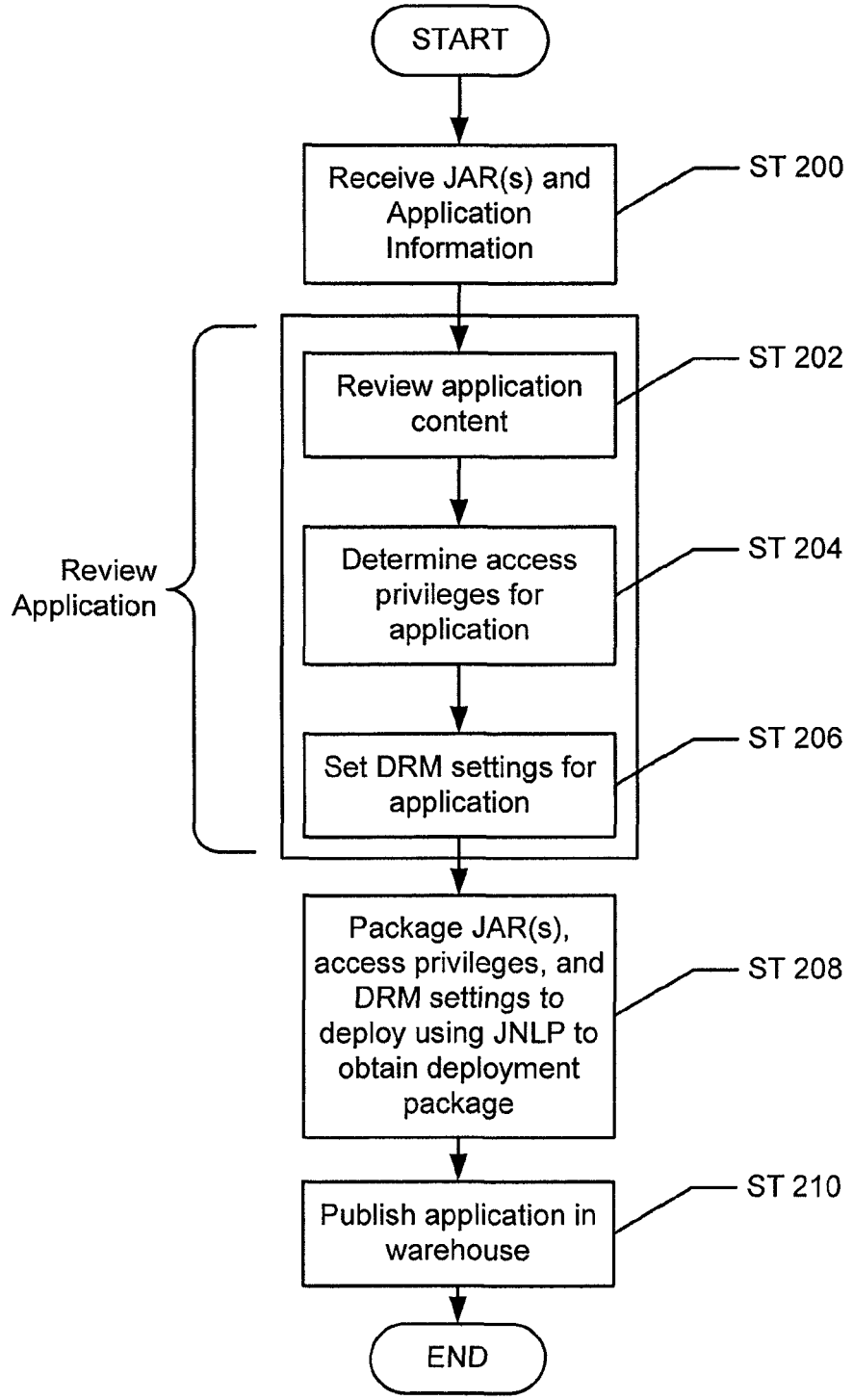

FIG. 4 shows a method in accordance with one or more embodiment of the invention. More specifically, FIG. 4 shows a method for reviewing an application provided in FIG. 3 (or by another mechanism) to the warehouse. While the various steps in the flowchart are presented and described sequentially, one of ordinary skill will appreciate that some or all of the steps may be executed in different orders, may be combined, or omitted, and some or all of the steps may be executed in parallel.

In Step 200, the JAR and corresponding application information are received. In Step 202, the content (e.g., textual, graphical, and/or audio content) of the application is reviewed. In one embodiment of the invention, the content of the application may be reviewed by a reviewer via the application reviewer service. According to one or more embodiments of the invention, the text of the content submission is reviewed manually, and the JAR is reviewed automatically to check for viruses and to verify the code. According to one or more embodiments of the invention, the JAR and corresponding application information may be verified either manually or automatically (for example using emulators).

In Step 204, the access privileges for the application are determined. The access privileges may be determined, in part, from the application information. Further, the access privileges may be determined, in part, using rules specified by (or accessible to) the application reviewer service. In one embodiment of the invention, the access privileges may specify any level of granularity. For example, the access privileges may be (i) sandbox-only execution (i.e., the application may only execute within the sandbox), (ii) limited access execution outside a sandbox on a client device (i.e., the application may access a specified subset of the resources/data/peripherals outside of the sandbox), and (iii) full access execution on the client device.

In Step 206, the DRM settings for the application are set. The DRM settings may specify any type of DRM restrictions on the application. For example, according to one or more embodiments of the invention, DRM restrictions may be placed on the application that allow a user to merely access a preview of the application before the application is purchased. Another example is that DRM restrictions may be placed on an application that limit the number of times the application may be accessed, or set a time limit for how long an application is accessible. In one embodiment of the invention, the Step 206 may be performed by the DRM service.

In Step 208, the JAR(s), access privileges, and DRM settings are packaged for deployment using JNLP. In one embodiment of the invention, the warehouse includes the functionality to perform all the necessary action required in Step 208. Those skilled in the art will appreciate that the packaging may include creating multiple instances of the deployment package, where each instance of the deployment package is created for a specific type of client device (e.g., one instance for a desktop deployment, one instance for deployment on a first type of mobile device, one instance for deployment on a second type of mobile device, etc.). In Step 210, the application is published in the warehouse (i.e., the application may be installed or previewed by client devices). According to one or more embodiments of the invention, a published application is accessible through the content delivery service of the warehouse. In one embodiment of the invention, the Steps 208-210 may be performed by the content delivery service.

Figure 5:
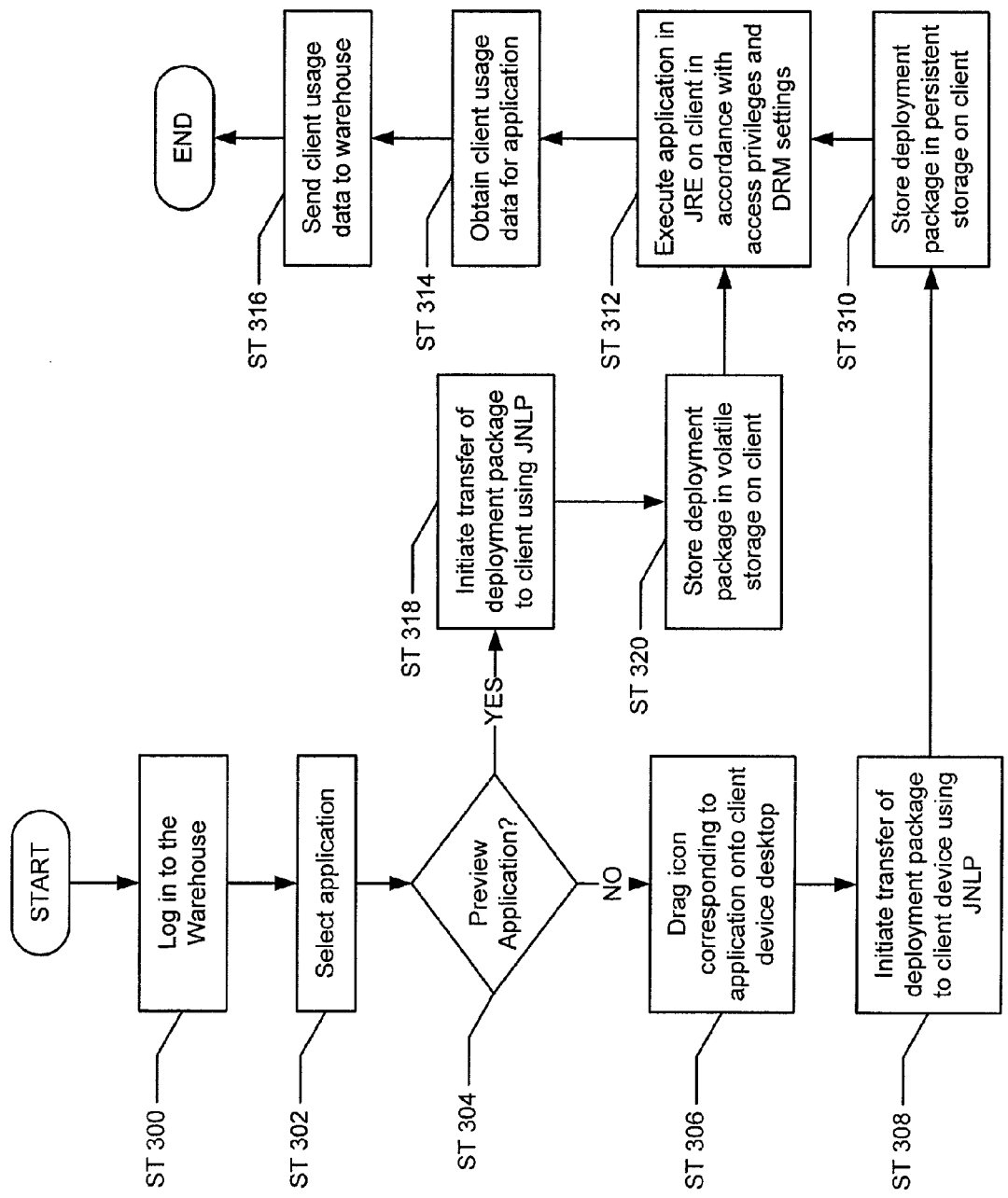

FIG. 5 shows a method in accordance with one or more embodiment of the invention. More specifically, FIG. 5 shows a method for previewing or installing an application on a client device. While the various steps in the flowchart are presented and described sequentially, one of ordinary skill will appreciate that some or all of the steps may be executed in different orders, may be combined, or omitted, and some or all of the steps may be executed in parallel.

In Step 300, a user logs into the warehouse, for example, using the content delivery service. In one embodiment of the invention, the user may access the warehouse via a web-browser (e.g., Firefox™, Google Chrome™, Internet Explorer™, or any microbrowser, minibrowser, or wireless internet browser) and/or via another application installed on the client device (Firefox® is a registered trademark owned by Mozilla, Inc., Mountain View, Calif.; Google Chrome® is a trademark owned by Google, Inc., Mountain View, Calif.; and Internet Explorer® is a registered trademark owned by Microsoft Corporation, Redmond, Wash.).

In Step 302, an application is selected by the user via the client device. In Step 304, a determination is made about whether the user wants to install the application or preview the application. If the application is to be installed, then method proceeds to Step 306. If the application is to be previewed, then the method proceeds to Step 318. In Step 306, the icon representing the application in the user interface provided by the content delivery service (via web-browser or other application on the client device) is dragged to the client device desktop (or home screen) (or otherwise selected). Those skilled in the art will appreciate that the deployment package may be transferred to the client device using other well know methods/mechanisms.

In Step 308, the "dragging" of the icon corresponding to the application to the client device desktop (or otherwise selecting the application) initiates the transfer of the deployment package (which may be client device type specific) to the client device using JNLP. In Step 310, the deployment package is stored in the persistent storage on the client device. In Step 312, the application is executed in the JRE on the client in accordance with the access privileges and DRM settings specified in FIG. 4.

In Step 314, client usage data is obtained from the client device (using, for example, JavaFX) related to the application usage on the client device. The client usage data may include personal identification information (i.e., information which identifies the user of the client device or any other personal/confidential information of the user of the client device). The personal identification information (or portions thereof) may be removed from the client usage data prior to sending the data to the warehouse. Alternatively, the client usage data is sent to the warehouse with the personal identification information, at which point it is removed by the warehouse prior to sending the client usage data to the developer (or other third-party, which provided the application to the warehouse). In Step 316, the client usage data is sent to the warehouse.

In Step 318, if the application is to be previewed, the deployment package (which may be client device type specific) is transferred to the client device using JNLP. In Step 320, the deployment package is stored in the temporary storage (or in a temporary manner) on the client device. For example, the deployment package is stored in volatile memory and is only available on the client device until the JRE is closed and/or as specified in the DRM settings. Those skilled in the art will appreciate that the DRM settings for an application which is being previewed may be more restrictive then the DRM settings on an installed application. The method then proceeds to Step 312. In one embodiment of the invention, when an application is previewed, the full application may be sent for previewing or, alternatively, a version with less functionality than the full application (i.e., the "preview version") may be sent to the client device. Further, once the previewing is complete—e.g., the user has used the application for a specified period of time, turns off the device, executes the JVM, then the application may rendered in accessible to the user of the device.

Figure 6:
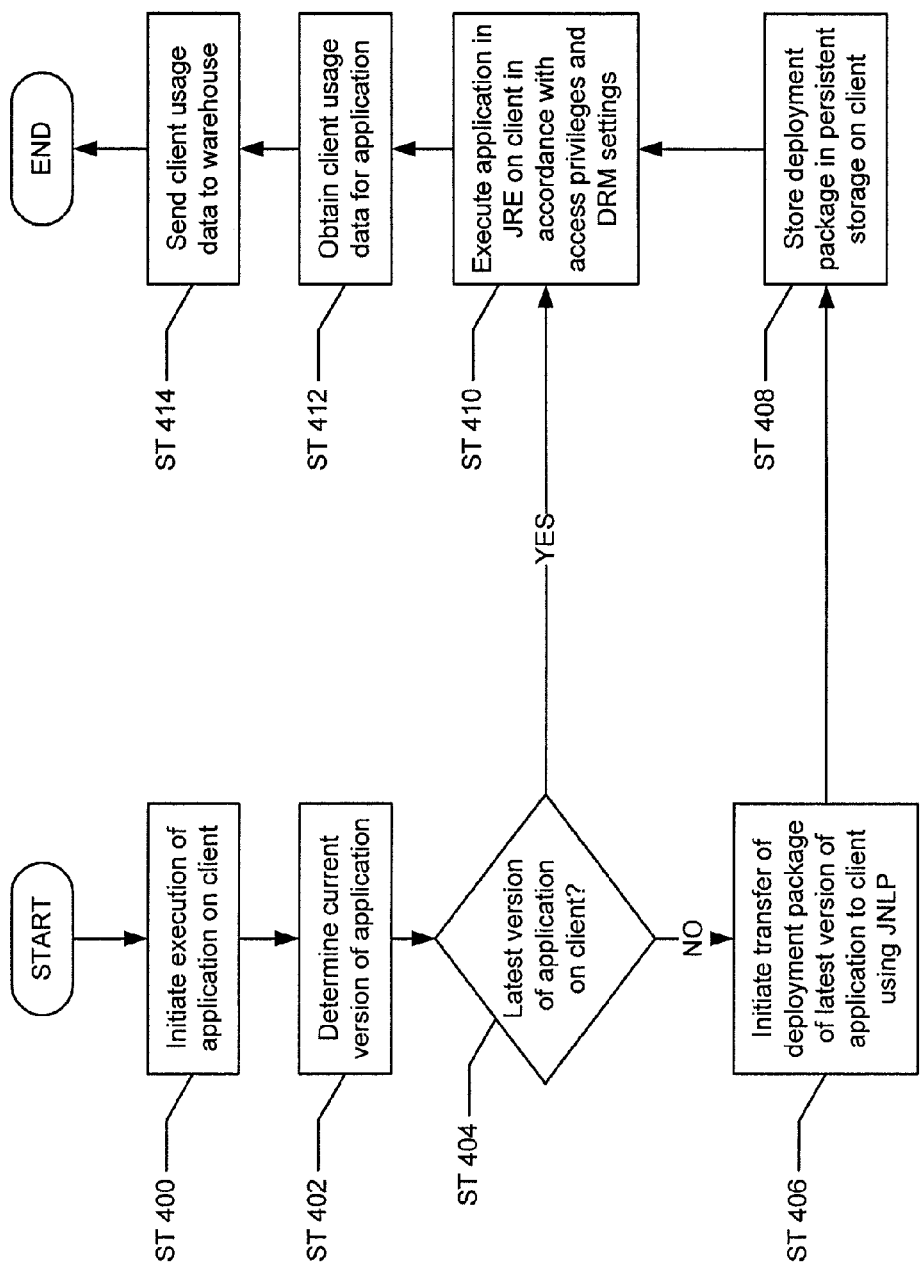

FIG. 6 shows a method in accordance with one or more embodiment of the invention. More specifically, FIG. 6 shows a method for executing an application previously installed on the client device. While the various steps in the flowchart are presented and described sequentially, one of ordinary skill will appreciate that some or all of the steps may be executed in different orders, may be combined, or omitted, and some or all of the steps may be executed in parallel.

In Step 400, execution of the application is initiated on the client device using any known method of initiating an application (e.g., double-clicking an icon corresponding to the application, entering a command line instruction, etc.). In Step 402, the current version of the application on the client device is determined (or otherwise obtained). In Step 404, a determination is then made about whether the version of the application on the client device is the latest version, where the latest version is available in the warehouse. If the application on the client device is the latest version, then the method proceeds to Step 410; otherwise, the method proceeds to Step 406. In one embodiment of the invention, a checksum is calculated for each version of the application using a checksum function (e.g., SHA1, MD5, etc.). In such embodiments, the determination in Step 404 is performed by comparing the checksum of the version of the application on the device with the checksum of the latest version of the application.

In Step 406, the deployment package (which may be client device type specific) that includes the latest version of the application is transferred to the client device using JNLP.

In Step 408, the deployment package is stored in the persistent storage on the client device. In Step 410, the application is executed in the JRE on the client in accordance with the access privileges and DRM settings specified in FIG. 4.

In Step 412, client usage data is obtained from the client device (using, for example, JavaFX) related to the application usage on the client device. The client usage data may include personal identification information (i.e., information which identifies the user of the client device or any other personal/confidential information of the user of the client device). According to one or more embodiments of the invention, the client usage data may be cached locally on the client device and only transferred periodically. The personal identification information (or portions thereof) may be removed from the client usage data prior to sending the data to the warehouse. Alternatively, the client usage data is sent to the warehouse with the personal identification information, at which point it is removed by the warehouse prior to sending the client usage data to the developer (or other third-party, which provided the application to the warehouse). In Step 414, the client usage data is sent to the warehouse. Those skilled in the art will appreciate that two or more of the aforementioned methods shown in FIGS. 3-6 may be performed in parallel.

In one embodiment of the invention, a user may access the warehouse using different client devices. In such cases, a user may have a common user account at the warehouse across all their client devices and, as such, have rights to install the same application on each of the their client devices. For example, if user A purchases and installs application 1 on their mobile phone and then subsequently accesses the warehouse from their laptop, user A may install application 1 on their desktop without purchasing an additional copy of application 1.

The following discussion shows examples of various implementations of the invention. The examples are not intended to limit the scope of the invention.

FIGS. 7-14 show example screen shots of an implementation according to one or more embodiments of the invention. Specifically, according to one or more embodiments of the invention, FIGS. 7-14 show example screenshots provided by the warehouse to the developer that facilitate in sending applications and application information from the developer to the warehouse.

Figure 7:
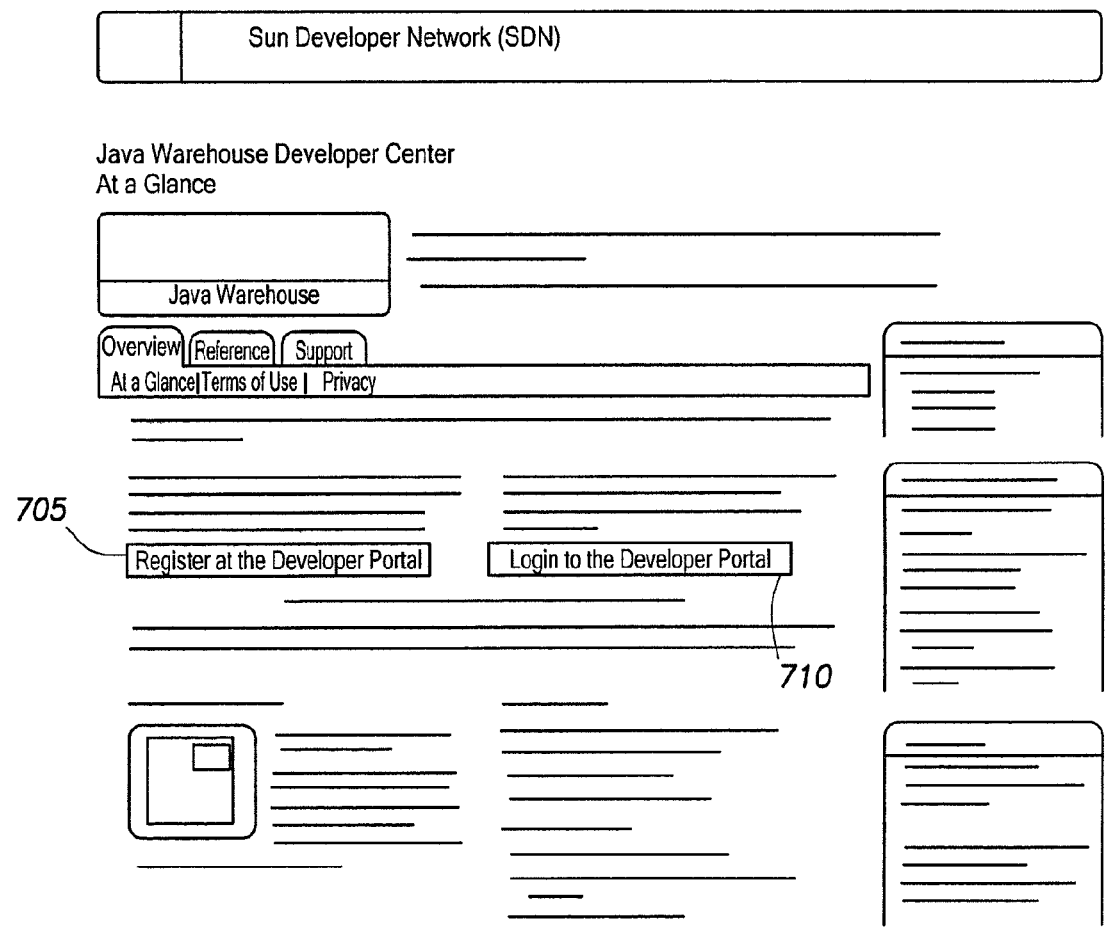

FIG. 7 shows one implementation of what a developer might first encounter in submitting an application to the warehouse. More specifically, FIG. 7 shows a screenshot of what display the developer might first encounter when sending an application to the warehouse through a developer portal. According to one or more embodiments of the invention, a developer may need to be registered in order to access the portal. The interface shown in FIG. 7 allows a developer to either register by selecting a registration icon (705), or login into the developer portal by selecting a login icon (710).

FIG. 8 shows a screenshot of a display a developer encounters in submitting a new application, according to one or more embodiments of the invention. Specifically, the screenshot shows a page prompting the developer to enter application information. According to one or more embodiments of the invention, the developer has registered with the warehouse and has provided login information to the warehouse such that the warehouse may identify and authenticate the developer. In this example, the developer may provide application information including the Application Name (805), Short Description (810), and Full Description (815), as described above. In addition, the developer may provide Categories (820) (i.e., a list of categories to which the application belongs), a Help Page URL (825) (i.e., an address to a web page where a user may find support information for the application), and an Application Price (830) (i.e., the cost to purchase the application). According to one or more embodiments of the invention, the developer may choose to provide the application for free, or may select a price at which to provide the application. The developer may also choose an Auto-Publish option (835), which, when selected, allows the application to publish upon approval, rather than requiring consent by the developer, according to one or more embodiments of the invention. Though not shown in FIG. 8, the developer may be prompted to enter the country from which the application is being submitted. The country information along with the description of the application may be used to determine whether there are any import/export control issues that need to be addressed with respect to the application. In addition, the developer, via the GUI shown in FIG. 8, may also specify a location of a demo version of the application, where the demo version includes limited functionality. The demo version of the application may be published and subsequently used as a marketing tool for potential customers to determine whether they want to ultimately purchase the full version of the application.

FIG. 9 shows another example of an interface a developer may use to submit a new application, according to one or more embodiments of the invention. In this example, the interface prompts the developer to enter application information include the application name (905), a short description of the application (910), a full description of the application (915), and one or more categories that describe the application (920). Further, in this example, the interface provides the developer with the ability to upload the JAR file that includes the application (925), as well as a file that includes the preview of the application (930). In this example, the developer is also able to submit a URL (935) at which a user may find a help page corresponding to the application. This example illustrates that according to one or more embodiments of the invention, the developer may be required to enter data into certain fields in order to submit the application for approval (i.e., Application Name (905), Short Description (910), Full Description (915), Category (920), Upload JAR from (925), and Help Page URL (935)), while other fields are optional (i.e., Upload Preview from (930)). Once the above information is entered, the application may be submitted for approval using the Submit For Approval button (955). Further, this figure illustrates that according to one or more embodiments of the invention, a developer may view the portal at which a user would access the application using a button labeled "Open Store View" (940). In addition, the developer may confirm that the JAR for the application (specified, for example, in Upload JAR from (925)) executes properly using the Run Now (955) button.

According to one or more embodiments of the invention, selecting this icon presents the developer with a display showing what the application will look like in the portal when it is published. According to one or more embodiments of the invention, the developer may choose the icon labeled "Save Draft" (945), which allows the user to suspend the submission process and return to complete it at a later time. According to one or more embodiments of the invention, when the required fields have been filled, the developer may select "Next" (950) to view the next interface in the submission process. According to one or more embodiments of the invention, the interface includes an icon for "Submit for Approval," which, as shown, is unable to be selected because more information about the application is required. Finally, at any time, the developer may choose the "Cancel" (960) the submission process. According to one or more embodiments of the invention, cancelling the submission process results in losing any information that has been entered regarding the application.

Figure 10:
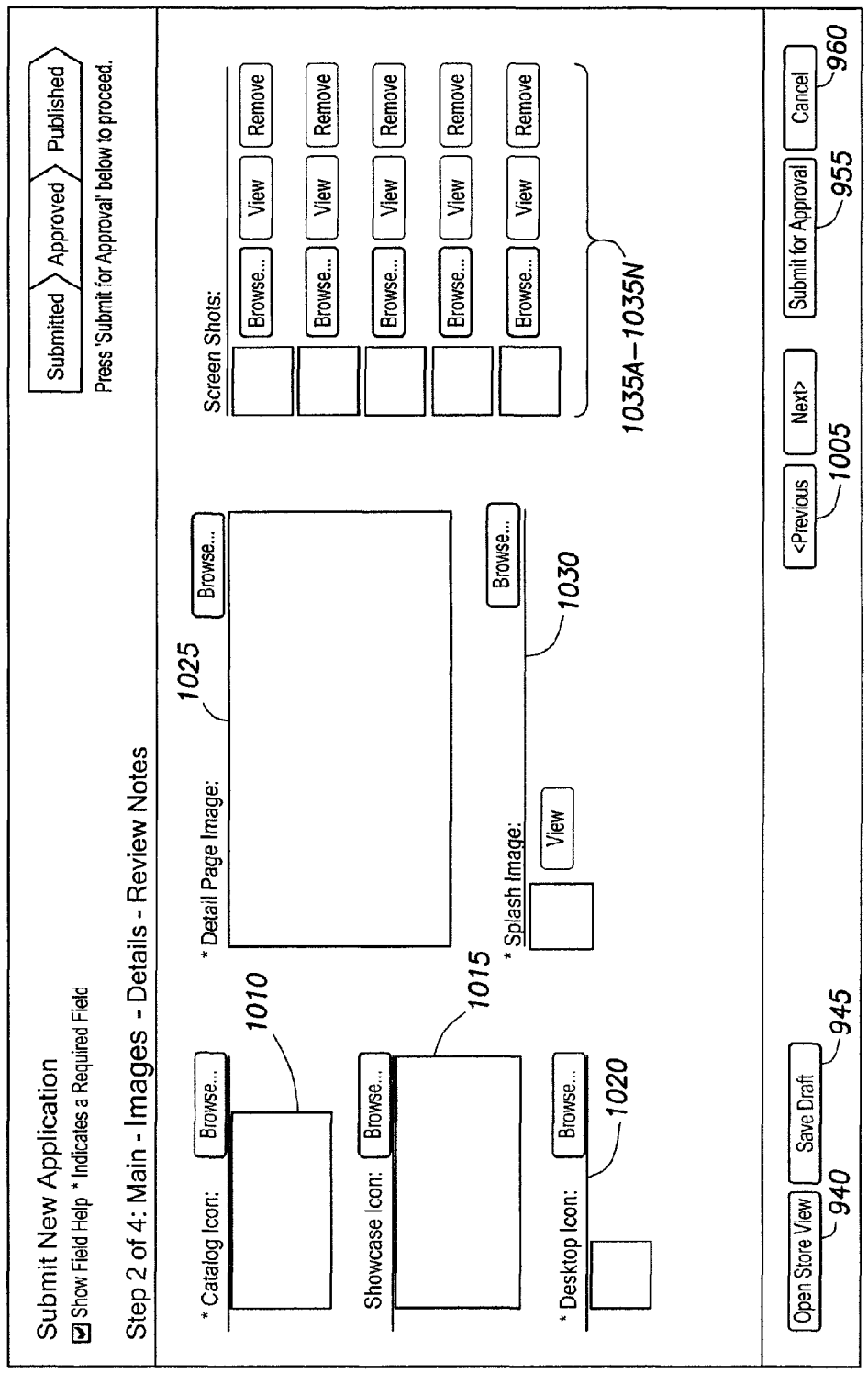

FIG. 10 shows an interface following FIG. 9, where a developer may upload images corresponding to the application. In this example, some of the items that were present in the interface shown in FIG. 9 remain in FIG. 10, including the Open Store View (940), Save Draft (945), Next (950), Submit for Approval (955), and Cancel (960). In addition, the interface now includes a "Previous" button (1005), which, when selected, allows the developer to return to the interface shown in FIG. 9, according to one or more embodiments of the invention.

In this example, a developer is provided mechanisms to upload a number of images corresponding to the application. These include a catalog icon (1010), a showcase icon (1015), a detailed page image (1025), a desktop icon (1020), a splash image (1030), and a number of screen shots (1035A-1035N). According to one or more embodiments of the invention, the developer may submit the application at this point, or may continue to include more details about the application at another page of the user interface before the application is submitted.

FIG. 11 shows an interface that follows FIG. 10 that facilitates in sending an application to the warehouse. Again, as in FIGS. 9 and 10, this page of the interface also includes certain items from previous pages of the interface, including the Open Store View (940), Save Draft (945), Previous (1005), Next (950), Submit for Approval (955), and Cancel (960). In this page of the interface, the developer may enter an application ID (1110) (i.e., an alpha-only, numeric-only, or alpha-numeric sequence that identifies the application), a version number (1115) (i.e., an alpha-only, numeric-only, or alpha-numeric sequence that identifies the version of the application), and a version description (1120) (i.e., a description of the particular version of the application). The application that the developer is sending to the warehouse may be a newer version of a previously submitted application. This page of the interface allows the developer to include important information about the relationship of the current application to a previously submitted application so that the connection will be made in the warehouse. For example, the previously submitted application may be identified by the same application number (but with a different version number), and by providing this information to the warehouse, such a connection is made. FIG. 11 also allows the developer to specify which JRE version is required (1125), and information regarding Java Sandbox (1130) (i.e., with what permission should the Java Sandbox be associated with when the application is executed within the Java Sandbox).

Figure 12:
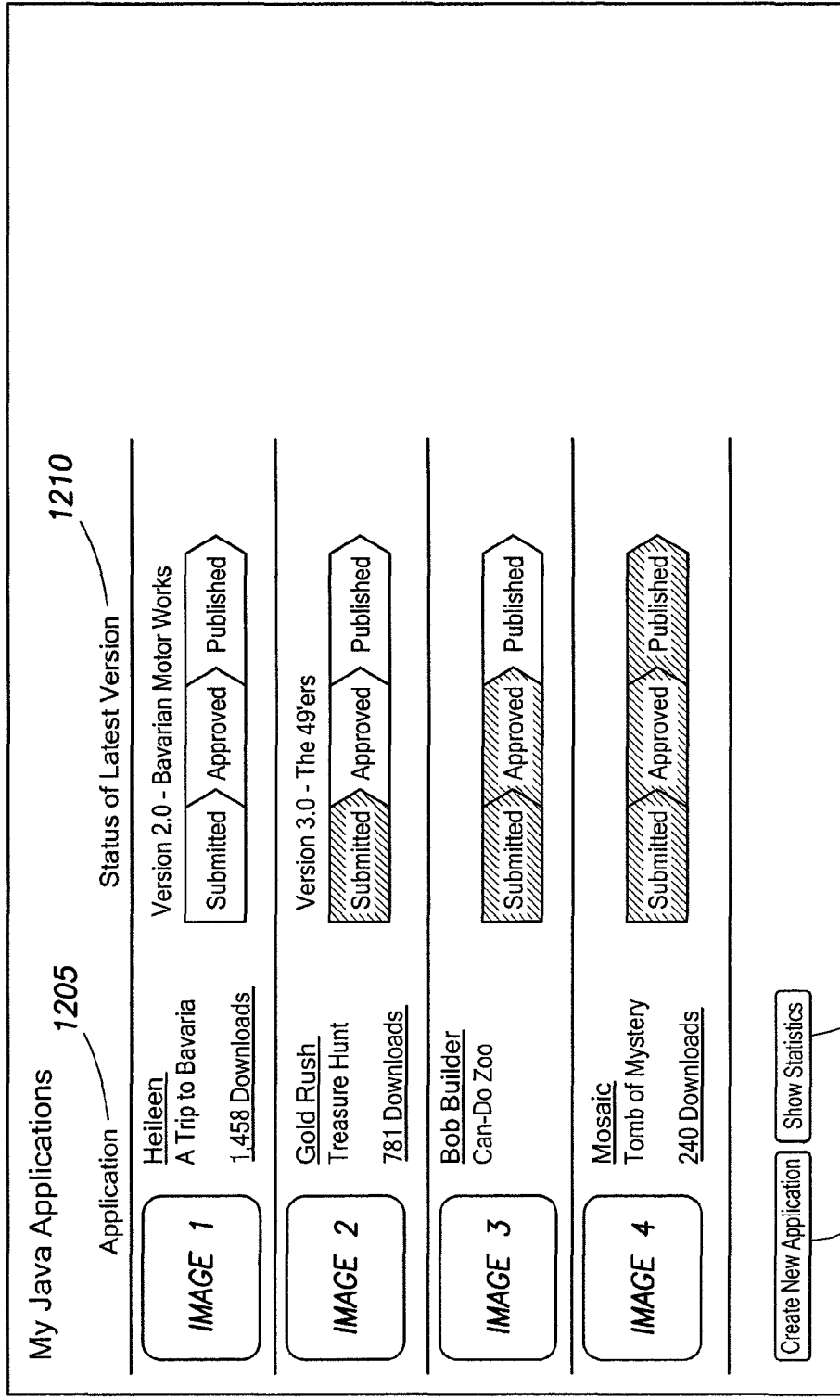

Upon publication of the application, the developer may wish to review and/or edit information about the application, and/or edit the application itself. For example, the developer may wish to provide a new version of the application with the original application information if the new version is simply to address problems with the JAR that arise during execution of a previous version of the application. According to one or more embodiments of the invention, the warehouse may provide an interface similar to those shown in FIGS. 9-11, to allow a developer to review information about the applications they have submitted (or are to be submitted). FIG. 12 shows an interface that allows a developer to see all applications that have been submitted to the warehouse (1205), as well as the status of the latest version of the application (1210), according to one or more embodiments of the invention. According to one or more embodiments of the invention, this includes applications that have been published, as well as those that have merely been submitted or approved. In addition, this interface may include applications that have not yet been submitted. Said another way, the interface allows a developer to view applications at all stages in the process. In addition, the interface allows the developer to choose to create a new application (1215), or show statistics of a published application (1220). According to one or more embodiments of the invention, the developer may also view review content from the reviewers of the application. For example, the reviewers may ask the developer to fix various issues with the application including, but not limited to, icons used in the application, description of the application, coding issues in the application, etc. According to one or more embodiments of the invention, the review content may be interactive (e.g., the developer may be asked to answer questions regarding the application being reviewed).

Figure 13:
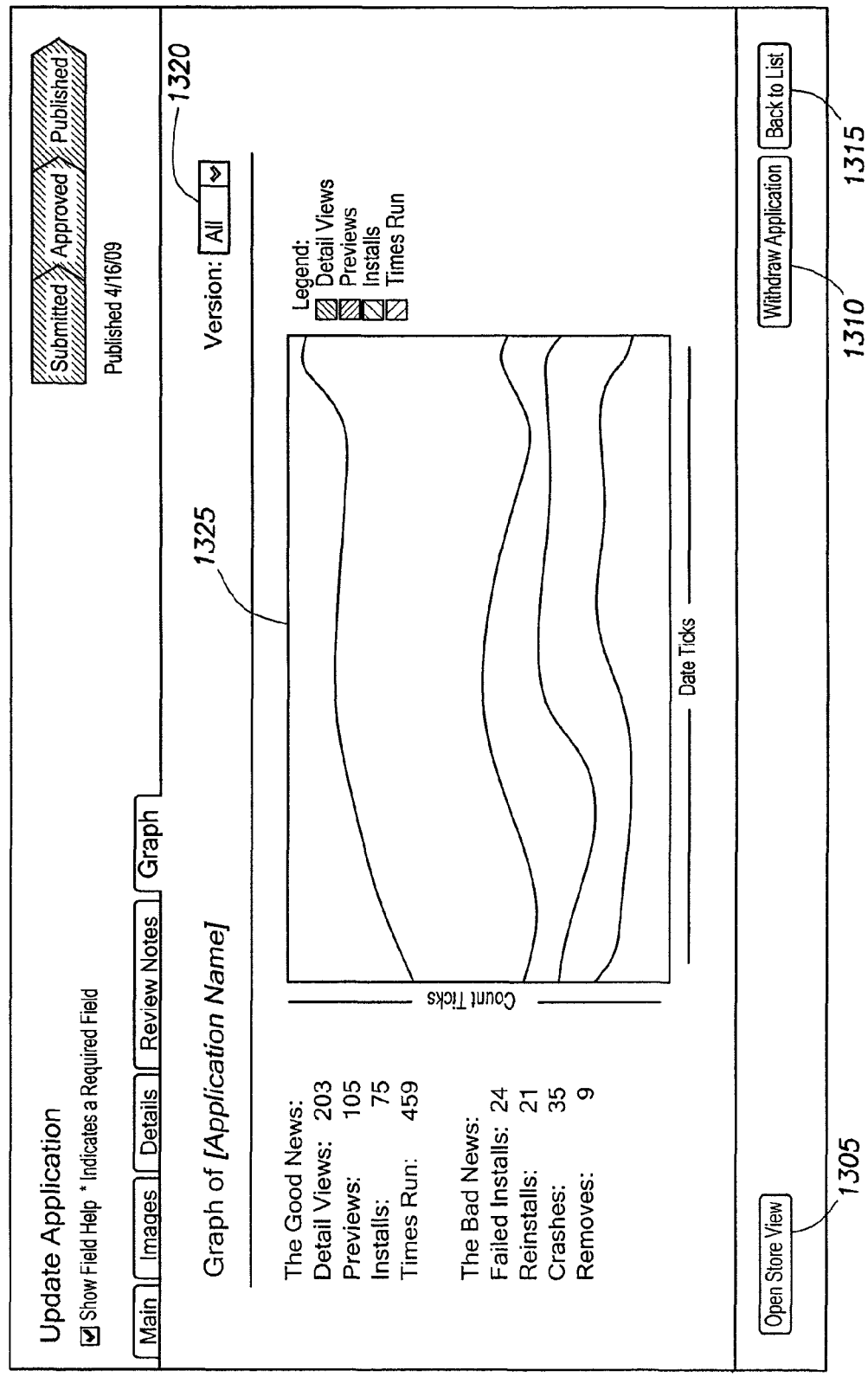

FIG. 13 shows an interface allowing a developer to view statistics regarding a published application. According to one or more embodiments of the invention, the statistics are presented in real time and updated as users use the application. Specifically, this page of the interface shown in FIG. 13 illustrates a graph of user activity relating to the submitted application. According to one or more embodiments of the invention, the interface allows the developer to Open Store View (1305) (i.e., view the application as it is found in the portal). The interface also allows the developer to withdraw an application (1310) so that it is no longer accessible by users, or to return to the list of applications (1315) (i.e., the list of applications as shown in FIG. 12).

As explained above, the warehouse collects information regarding usage of the applications and generates statistics and charts regarding that data. In this example, the interface allows the user to see information on a two-dimensional graph (1325) in terms of count ticks (i.e., the number of times an event occurred) and date ticks (i.e., the date that the count ticks were recorded). This example includes information regarding all events (1320) for all versions of the application. These include positive events such as detail views (i.e., the number of times a user has requested to view detailed information about the application), previews (i.e., the number of times a user has previewed an application), installs (i.e., the number of times a user has installed the application), and times run (i.e., the number of times a user has run the application). The interface also includes information regarding negative events, including failed installs (i.e., the number of times a user has tried, and failed, to install the application), reinstalls (i.e., the number of times a user has installed the application after the first time), crashes (i.e., the number of times the application has reached a non-recoverable error state), and removes (i.e., the number of times the application has been uninstalled by a user). In addition, the interface allows the developer to view statistics regarding the application based on the version of the application (1320).

Figure 14:
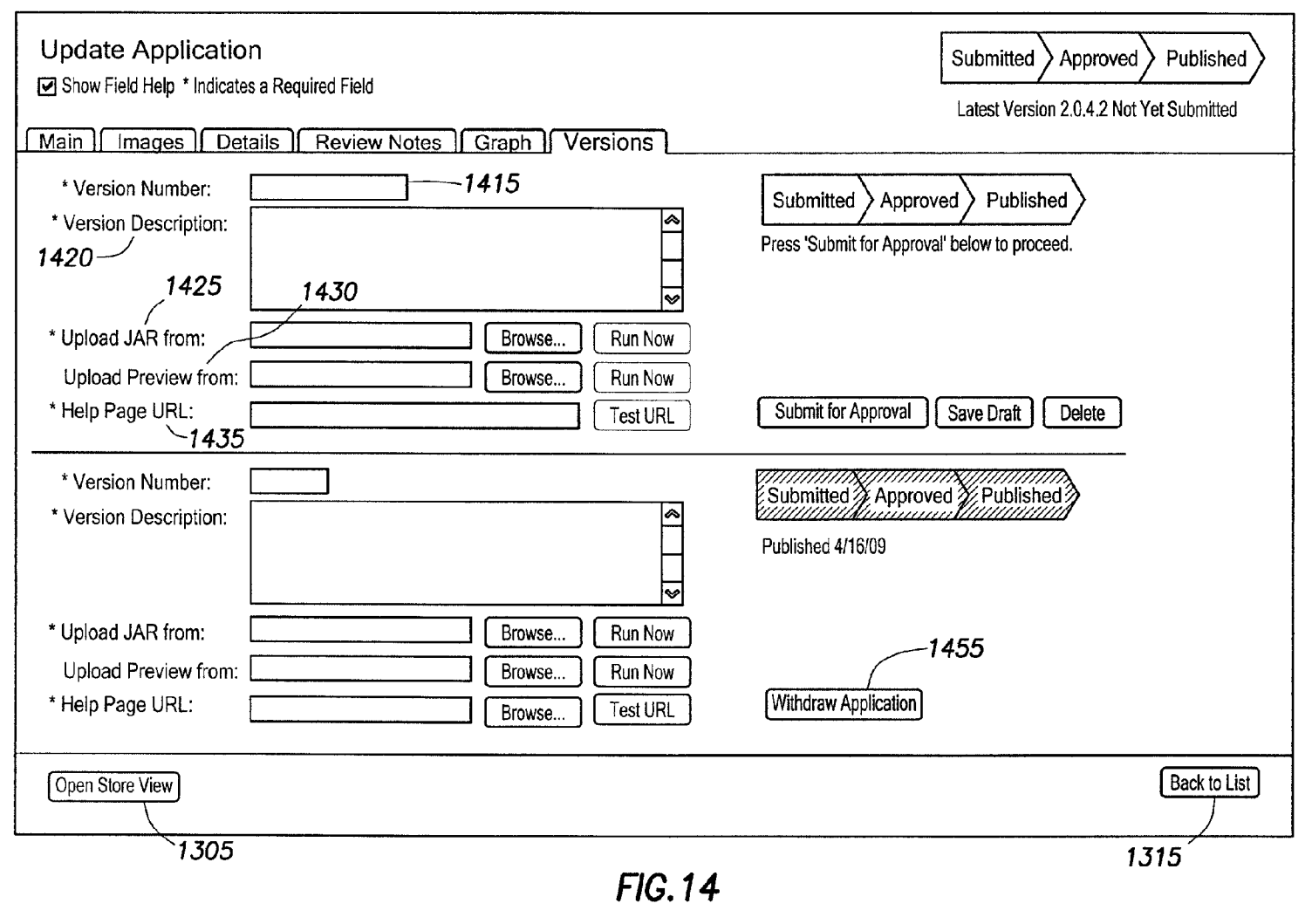

FIG. 14 shows another page of the interface where the developer may update an application. Specifically, FIG. 14 shows an interface that allows the developer to submit a new version of the application for approval. The interface shown in FIG. 14 includes similar options as those shown in FIGS. 12-13, including the option to Open Store View (1305), and the option to return back to the list of applications (1315). In this example, the interface allows the developer to enter a version number (1415) and version description (1420), as well as functionality to upload a JAR file for the new version of the application (1425), upload a preview of the new version of the application (1430), and enter a help page URL (1435). Although not shown, this interface may also include information about previously published versions of the application and allow the developer to withdraw those versions (1455) from being available to users (excluding the developer—which maintains access to the version) on the warehouse. According to one or more embodiments of the invention, this interface may show information regarding applications that have been quarantined due to consumer complaints.

In one or more embodiments of the invention, applications submitted by developers and published by the warehouse are made available to users. According to one or more embodiments of the invention, applications may be made available to users through the content delivery service (i.e., Java Store interface). FIGS. 15-20 illustrate several interfaces made available to users in order to retrieve an application in the warehouse.

Figure 15:
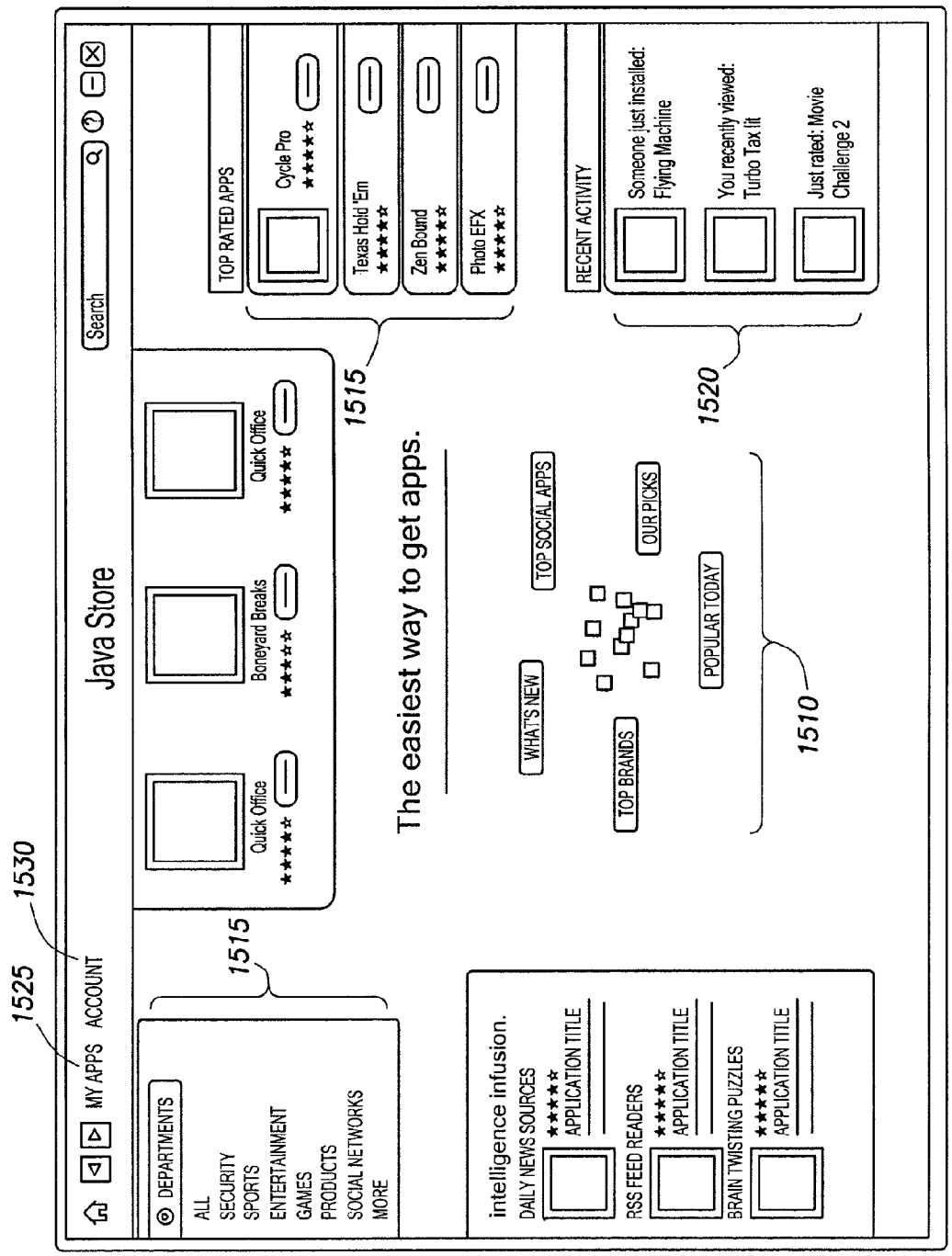

FIG. 15 shows an overview of the java store interface. As shown, the interface allows a user to choose an application by department (1505). According to one or more embodiments of the invention, the department that an application is located in is determined by the category that the developer has assigned. Further, the interface may include a list of applications (1515) that are popular within the Java Store (i.e., "Top Rated Apps"), and those applications that the user has recently viewed (1520). According to one or more embodiments of the invention, a user may have an account (1530), which tracks and stores information regarding the user's activity in the store. In addition, the interface allows the user to view his or her applications that the user has purchased (1525) (i.e., as shown in FIG. 12).

According to one or more embodiments of the invention, the Java Store may include other options for browsing through applications (1510). In the example shown, these include "What's New," "Top Social Apps," "Our Picks," "Popular Today," and "Top Brands." According to one or more embodiments of the invention, selecting the icon entitled "What's New" provides a user with a page dedicated to recently published applications. According to one or more embodiments of the invention, a user may also choose from applications that are most often previewed. According to one or more embodiments of the invention, selecting "Top Social Apps," provides the user with a page directed toward applications that have been characterized as "social networking" applications (i.e., the social networking category was chosen by the developer, or the applications are found in the social networking department). According to one or more embodiments of the invention, selecting "Our Picks" provides the user with a page dedicated to applications chosen by managers of the Java Store, or other members of the Java Store community. According to one or more embodiments of the invention, selecting "Popular Today" provides the user with a page dedicated to the applications most used that day. According to one or more embodiments of the invention, selecting "Top Brands" provides a user with a page dedicated to applications provided by popular developers (i.e., developers whose applications are the most used).

Figure 16:
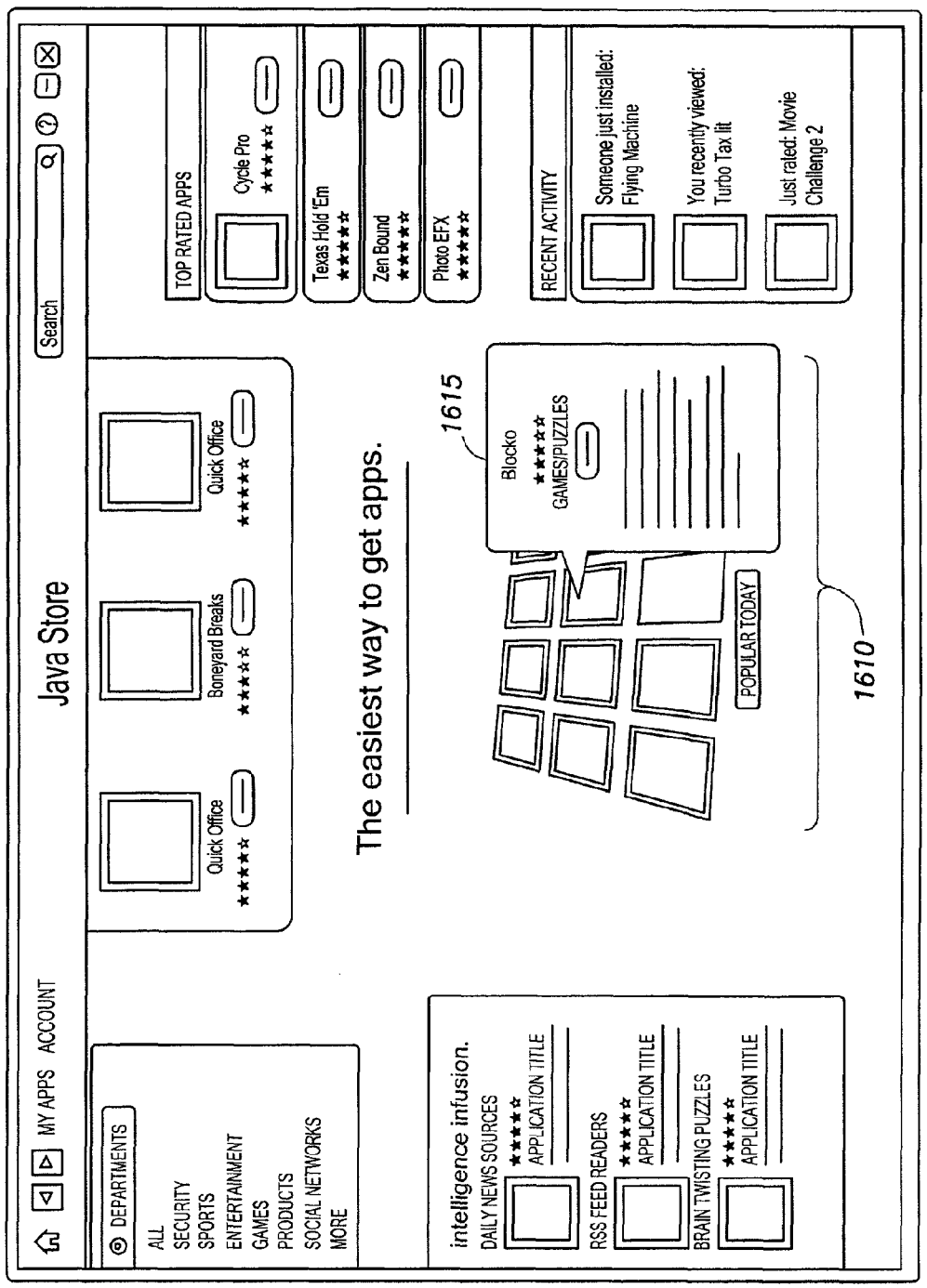

FIG. 16 shows an interface provided to the user when the user has chosen "Popular Today" from the interface of FIG.

15. Accordingly, the interface now shows a selection of applications from the category "Popular Today" (1610). Further, according to one or more embodiment of the invention, the specific screenshot in FIG. 16 shows the interface where the user has placed the cursor over the icon for the "Blocko" application. According to one or more embodiments of the invention, when the user places the cursor over a specific application, details about that application (1615) may appear on the screen. As described above, these details may be entered by the developer when submitting the application.

Figure 17:
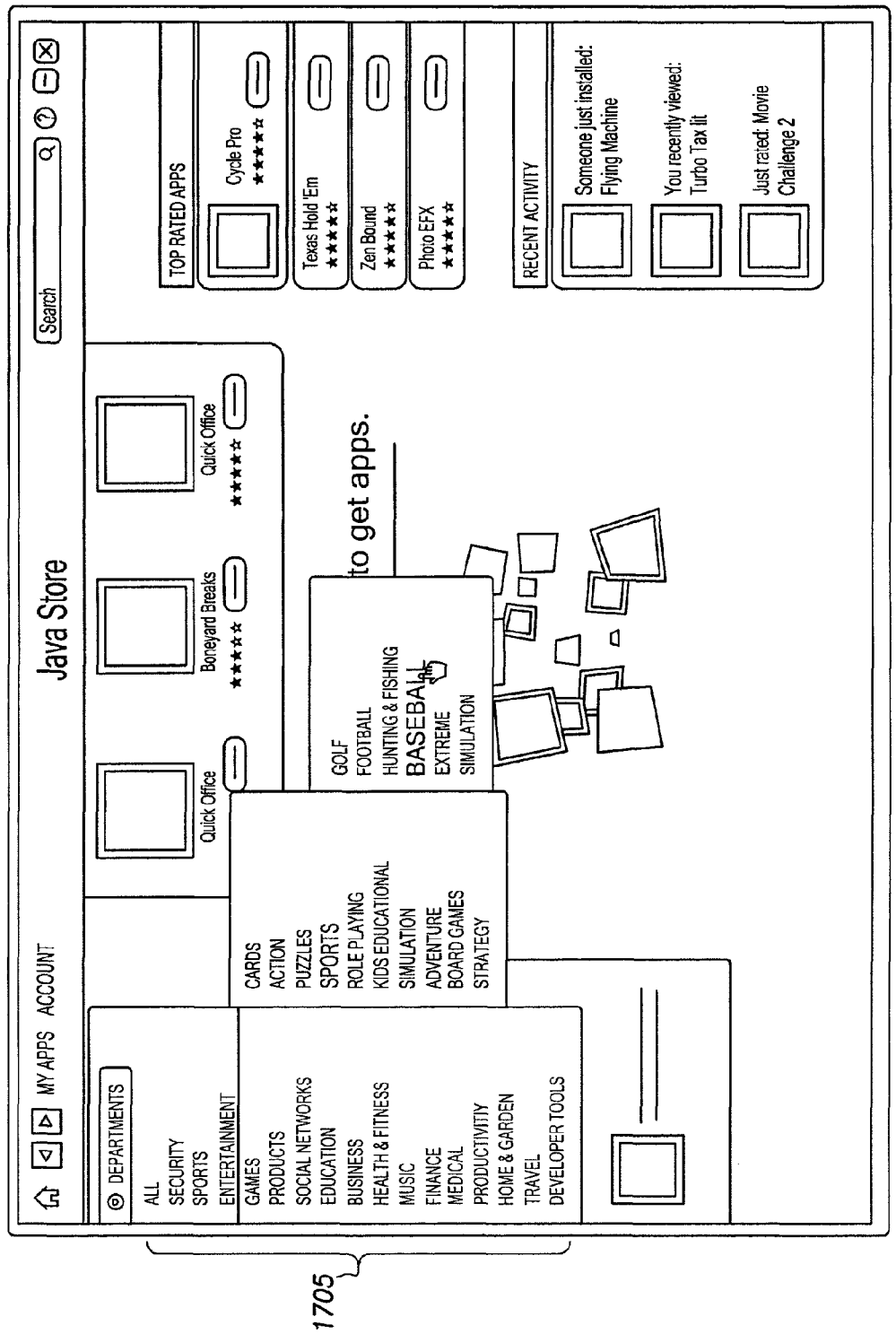

FIG. 17 shows an interface where the user has browsed through departments. According to one or more embodiments of the invention, the user may place the cursor over the department the user is interested in browsing, which provides a hierarchical list (1705) of categories and subcategories. For example, when the user places the cursor over the word "Games," a list of the types games appears in the user interface as subcategories of "Games." When the user places the cursor over one of the subcategories (i.e., "Sports"), another list appears (i.e., subcategories of sports). Although not shown, the hierarchical list may include applications as well as categories. In this example, the user has chosen Baseball, which is a subcategory of Sports and Games.

Figure 18:
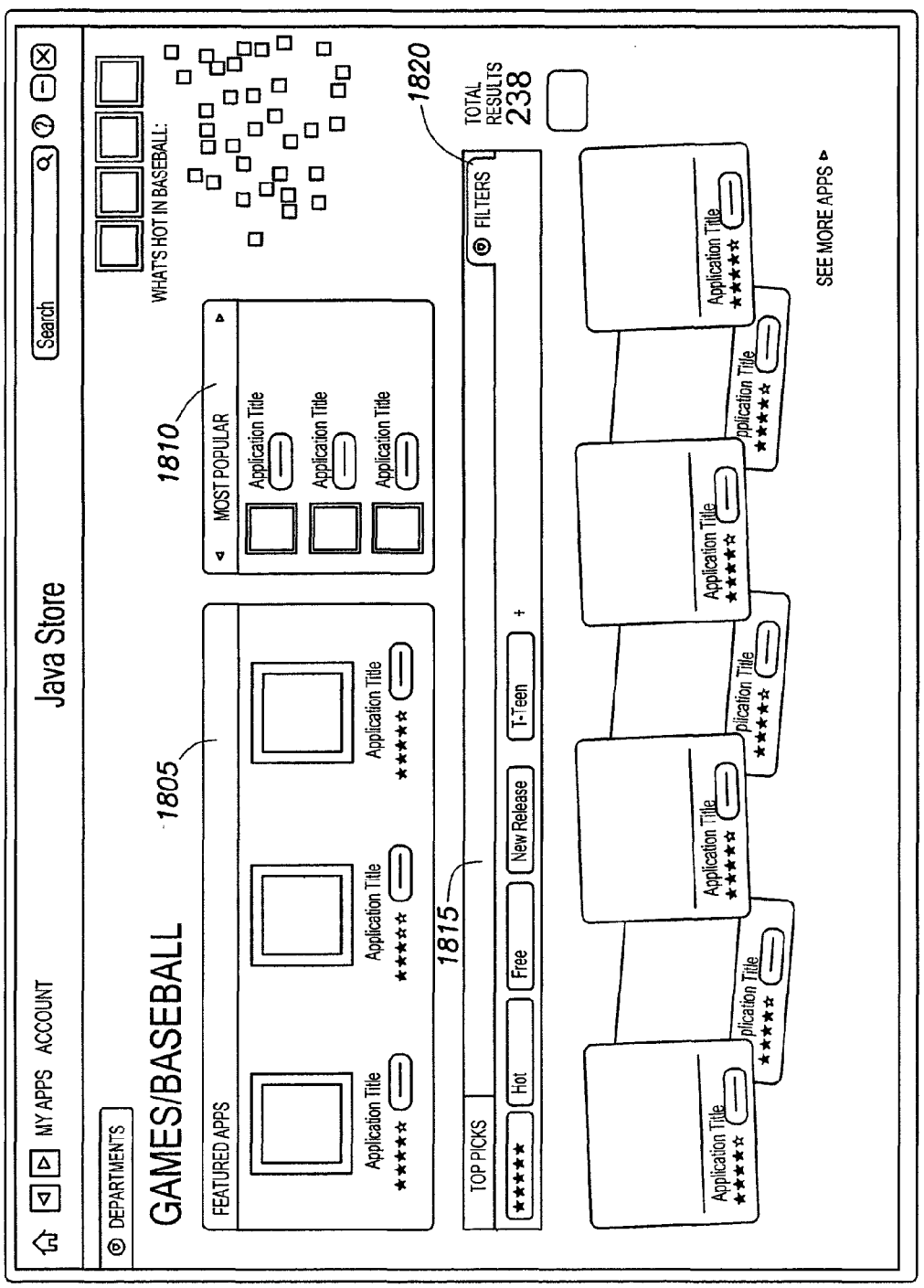
Figure 19:
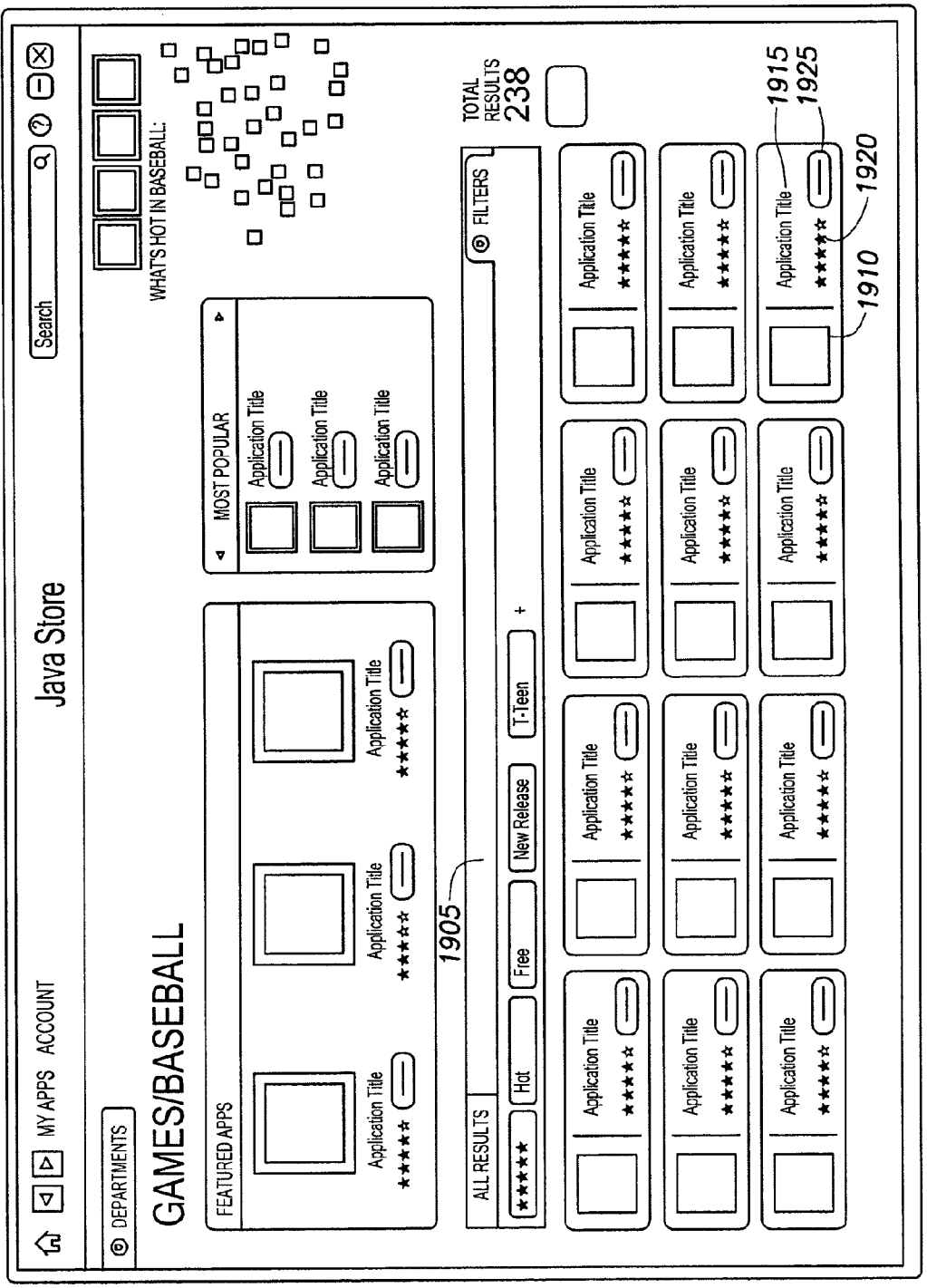

FIG. 18 shows one interface that may be presented to the user when Baseball is chosen. In this example, the user is presented with several methods for browsing baseball-related applications. These include "Featured Apps" (1805), "Most Popular" (1810), and "Top Picks" (1815). Additionally, the user may be presented with filters (1820) that allow the user to reduce the number of applications available. FIG. 19 shows an interface presented to the user when he or she chooses to view "All Results" (1905). The interface provides the user with basic information about the application (i.e., not all the information about the application provided by the developer. In this example, the information shown includes an icon (1910), an application title (1915), a rating for the application (1920), and the price of the application (1925). According to one or more embodiments of the invention, what is displayed in this interface may vary depending on the user. For example, a premium user may be provided more information than a standard user.

Figure 20:
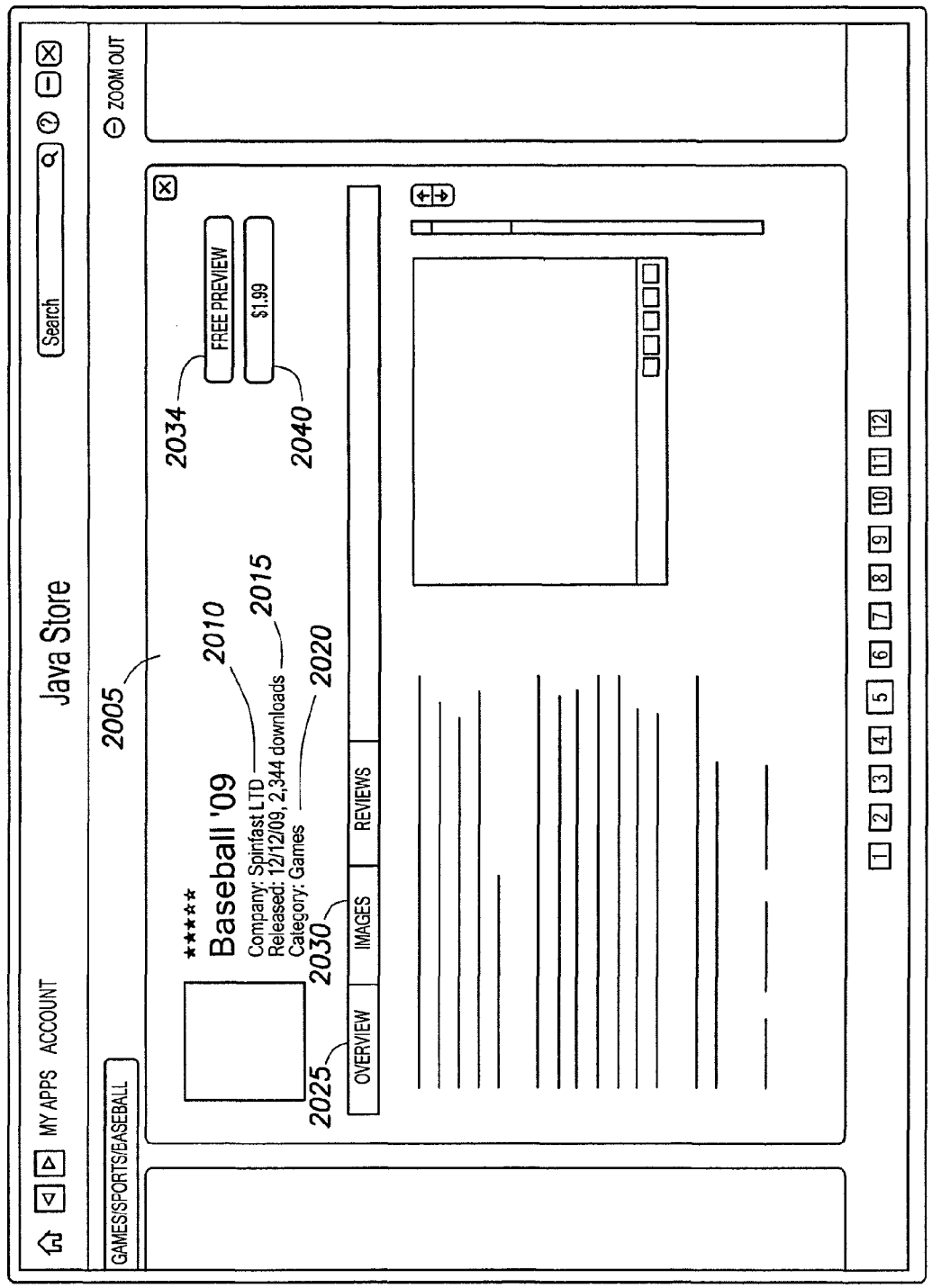

FIG. 20 shows an interface providing detailed information about a selected application. Specifically, in this example, the user has selected the "Baseball '09" application (2005). This time, the interface shows the company who published the application (2010), the release date of the application (2015), and the categories to which the application belongs (2020). Further, the interface includes an overview of the application (2025). According to one or more embodiments of the invention, the text found in the overview of the application may include information entered by the developer as "detailed information." Further, the interface shows images of the application (2030), and provides functionality for the user to either preview the application (2034), or purchase the application (2040). According to one or more embodiments of the invention, this interface may also include developer information. Specifically, this interface may include information regarding other applications by the same developer.

Figure 21:
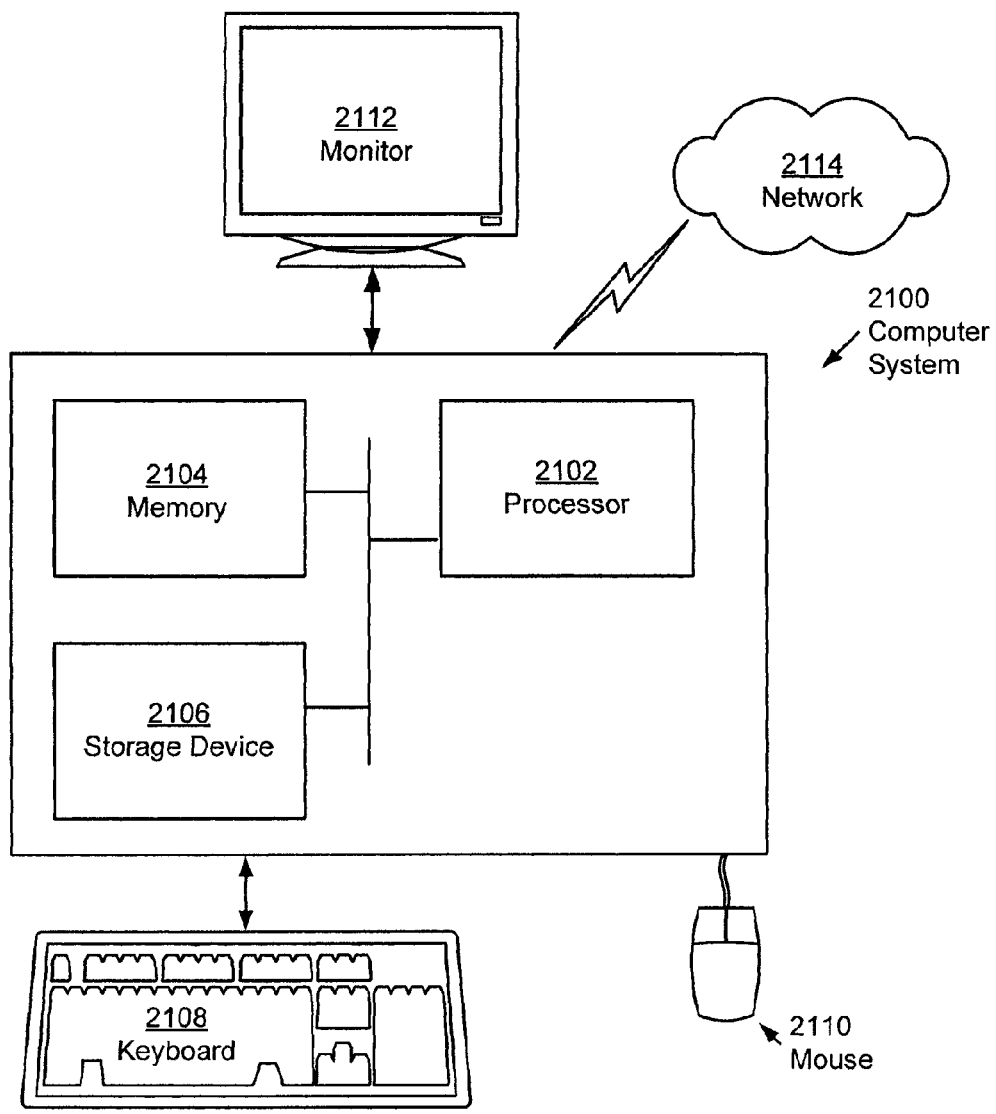
FIG. 21 shows a computer system in accordance with one or more embodiments of the invention.

Embodiments of the invention may be implemented on virtually any type of computer regardless of the platform being used. For example, as shown in FIG. 21, a computer system (2100) includes one or more processor(s) (2102), associated memory (2104) (e.g., random access memory (RAM), cache memory, flash memory, etc.), a storage device (2106) (e.g., a hard disk, an optical drive such as a compact disk drive or digital video disk (DVD) drive, a flash memory stick, etc.), and numerous other elements and functionalities typical of today's computers (not shown). The computer (2100) may also include input means, such as a keyboard (2108), a mouse (2110), or a microphone (not shown). Further, the computer (2100) may include output means, such as a monitor (2112) (e.g., a liquid crystal display (LCD), a plasma display, or cathode ray tube (CRT) monitor). The computer system (2100) may be connected to a network (2114) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. For example, the computer system (2100) may be a server system having multiple blades. Generally speaking, the computer system (2100) includes at least the minimal processing, input, and/or output means necessary to practice embodiments of the invention.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

What is claimed is:

1. A non-transitory computer readable medium comprising computer readable program code embodied therein for causing a computer system to perform a method, the method comprising:
receiving an application;
receiving application information for the application;
executing, for a reviewer, the application directly in a reviewer portal on the computer system, the reviewer portal accessible to the reviewer via a uniform resource locator;
determining an access privilege for the application based, in part, on the application information and the reviewer,
wherein the access privilege restricts execution of the application to a sandbox when the access privilege specifies sandbox-only execution,
wherein the access privilege permits limited access to resources outside the sandbox when the access privilege specifies limited access execution,
and
wherein the sandbox is an isolated execution environment within a runtime environment;
setting a digital rights management (DRM) setting for the application specifying that the application may be copied to multiple client devices;
generating a first deployment package for the application using the application, the DRM setting, and the access privilege, and based on a first client device type;
generating a second deployment package for the application using the application, the DRM setting, and the access privilege, and based on a second client device type:
publishing the application to a warehouse;
receiving a first request for the application from a first client device having the first client device type and associated with a user account at the warehouse, wherein the user account is associated with a purchased copy of the application;

providing the first deployment package to the first client device, wherein the first client device executes the first deployment package within the sandbox using the runtime environment on the first client device;

receiving a second request for the application from a second client device having the second client device type and associated with the user account; and providing, without requiring a purchase of another copy of the application, the second deployment package to the second client device, wherein the second client device executes the second deployment package within the sandbox using the runtime environment on the second client device.

2. The non-transitory computer readable medium of claim 1, wherein the method further comprises:

receiving client usage data from the first client device, wherein the client usage data includes information about the usage of the application on the first client device.

3. The non-transitory computer readable medium of claim 2, wherein the method further comprises:

providing, after removing personal identification information, the client usage data to a developer of the application.

4. The non-transitory computer readable medium of claim 2, wherein the client usage data is obtained using a separate application.

5. The non-transitory computer readable medium of claim 1, wherein the method further comprises:

providing a latest version of the application to the first client device when the first client device does not include the latest version of the application and the first client device is attempting to execute a version of the application other than the latest version of the application.

6. The non-transitory computer readable medium of claim 1, wherein the first client device is one selected from a group consisting of a computer connected to a wired network, a computer connected to a wireless network, a 2G mobile device, a 3G mobile device, a personal digital assistant, a smart phone, and a set-top box.

7. The non-transitory computer readable medium of claim 1, wherein the DRM setting is enforced by the runtime environment on the first client device.

8. The non-transitory computer readable medium of claim 1, wherein the application is received in an archive file format.

9. The non-transitory computer readable medium of claim 1, wherein the first deployment package is generated in accordance with a Network Launch Protocol.

10. The non-transitory computer readable medium of claim 9, wherein the access privilege is enforced by the runtime environment of the first client device.

11. The non-transitory computer readable medium of claim 1, wherein the application is a Java application.

12. A system for publishing an application, comprising:
a processor; and
a memory comprising computer readable code, executable by the processor, configured to:
receive an application and application information for the application;

execute, for a reviewer, the application directly in a reviewer portal on the processor, the reviewer portal accessible to the reviewer via a uniform resource locator, determine an access privilege for the application based, in part, on the application information and the reviewer,
  wherein the access privilege restricts execution of the application to a sandbox when the access privilege specifies sandbox-only execution,
  wherein the access privilege permits limited access to resources outside the sandbox when the access privilege specifies limited access execution, and
wherein the sandbox is an isolated execution environment within a runtime environment;

set a digital rights management (DRM) setting for the application specifying that the application may be copied to multiple client devices;

generate a first deployment package for the application using the application, the DRM setting, and the access privilege, and based on a first client device type;

generate a second deployment package for the application using the application, the DRM setting, and the access privilege, and based on a second client device type;

publish the application to a warehouse to make the first deployment package available for at least one selected from a group consisting of installation on a first client device and previewing on the first client device, wherein the first client device has the first client device type and is associated with a user account at the warehouse, wherein the user account is associated with a purchased copy of the application;

receive a first request for the application from the first client device;

provide the first deployment package to the first client device, wherein the first client device executes the first deployment package within the sandbox using the runtime environment on the first client device;

receive a second request for the application from a second client device having the second client device type and associated with the user account; and provide, without requiring a purchase of another copy of the application, the second deployment package to the second client device, wherein the second client device executes the second deployment package within the sandbox using the runtime environment on the second client device.

13. The system of claim 12, wherein the computer readable code is further configured to:

receive client usage data from the first client device, wherein the client usage data includes information about the usage of the application on the first client device.

14. The system of claim 13, wherein the computer readable code is further configured to:

provide, after removing personal identification information, the client usage data to a developer of the application.

15. The system of claim 12, wherein the computer readable code is further configured to:

provide a latest version of the application to the first client device when the first client device does not include the latest version of the application and the first client device is attempting to execute a version of the application other than the latest version of the application.

16. The system of claim 12, wherein the DRM setting is enforced by the runtime environment on the first client device.

17. A method comprising:

receiving, by a computer system, an application;

receiving, by the computer system, application information for the application;

executing, for a reviewer, the application directly in a reviewer portal on the computer system, the reviewer portal accessible to the reviewer via a uniform resource locator;

determining an access privilege for the application based, in part, on the application information and the reviewer,
  wherein the access privilege restricts execution of the application to a sandbox when the access privilege specifies sandbox-only execution,
  wherein the access privilege permits limited access to resources outside the sandbox when the access privilege specifies limited access execution, and
  wherein the sandbox is an isolated execution environment within a runtime environment;

setting a digital rights management (DRM) setting for the application specifying that the application may be copied to multiple client devices;

generating, by the computer system, a first deployment package for the application using the application, the DRM setting, and the access privilege, and based on a first client device type;

generating a second deployment package for the application using the application, the DRM setting, and the access privilege, and based on a second client device type:

publishing, by the computer system, the application to a warehouse;

receiving a first request for the application from a first client device having the first client device type and associated with a user account at the warehouse, wherein the user account is associated with a purchased copy of the application;

providing, by the computer system, the first deployment package to the first client device, wherein the client device executes the first deployment package within the sandbox using the runtime environment on the first client device;

receiving a second request for the application from a second client device having the second client device type and associated with the user account; and providing, without requiring a purchase of another copy of the application, the second deployment package to the second client device, wherein the second client device executes the second deployment package within the sandbox using the runtime environment on the second client device.

* * * * *